(12) United States Patent
Hirano et al.

(10) Patent No.: US 7,924,745 B2
(45) Date of Patent: Apr. 12, 2011

(54) HYBRID MOBILE COMMUNICATION SYSTEM COMPRISING MULTI-HOP-AD-HOC AND CIRCUIT-SWITCHED MODES

(75) Inventors: Jun Hirano, Kanagawa (JP); Chan Wah Ng, Singapore (SG); Tien-Ming Benjamin Koh, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 684 days.

(21) Appl. No.: 11/721,773

(22) PCT Filed: Dec. 21, 2005

(86) PCT No.: PCT/JP2005/024004
§ 371 (c)(1),
(2), (4) Date: Mar. 28, 2008

(87) PCT Pub. No.: WO2006/068295
PCT Pub. Date: Jun. 29, 2006

(65) Prior Publication Data
US 2008/0253340 A1  Oct. 16, 2008

(30) Foreign Application Priority Data
Dec. 21, 2004  (JP) .................................. 2004-369970

(51) Int. Cl.
*H04L 12/28* (2006.01)
(52) U.S. Cl. ........................................ 370/254; 370/401
(58) Field of Classification Search .................. 370/254, 370/401
See application file for complete search history.

(56) References Cited

U.S. PATENT DOCUMENTS

| | | | |
|---|---|---|---|
| 5,987,011 A | 11/1999 | Toh | |
| 6,456,599 B1 | 9/2002 | Elliott | |
| 6,636,498 B1 | 10/2003 | Leung | |
| 2001/0024443 A1 | 9/2001 | Alriksson et al. | |

(Continued)

FOREIGN PATENT DOCUMENTS

CN  1523787  8/2004

(Continued)

OTHER PUBLICATIONS

C. Perkins, Ed. "IP Mobility Support for IPv4," Network Working Group, RFC 3344, Aug. 2002, p. 1-99.

(Continued)

*Primary Examiner* — Kevin C Harper
(74) *Attorney, Agent, or Firm* — Dickinson Wright PLLC

(57) ABSTRACT

According to the present invention, connection can be always maintained between the mobile node and the access router, and disruption of on-going transport session can be prevented by making effective use of two architectures (hierarchical and mesh architectures). The mobile nodes 1000-1, 1000-2 and 1000-3 are attached to the access router 1100-1. When the mobile node maintains link layer connectivity with the access router, it is in the hierarchical mode, whereas when the link layer connectivity is lost, it enters the mesh mode. In the mesh mode, the mobile node attempts to establish virtual link layer connectivity with the access router through other nodes by using mesh network protocol such as MANET. In the mesh mode, the packet is capsulated between the mobile node and the access router when the mobile node and the peer 1400-1 communicate with each other.

16 Claims, 24 Drawing Sheets

U.S. PATENT DOCUMENTS

| | | | |
|---|---|---|---|
| 2003/0235175 A1 | 12/2003 | Naghian et al. | |
| 2004/0166853 A1 | 8/2004 | Takeda | |
| 2004/0208144 A1 | 10/2004 | Vinayakray-Jani | |
| 2005/0099974 A1* | 5/2005 | Kats et al. | 370/328 |
| 2008/0205308 A1* | 8/2008 | Prehofer et al. | 370/310 |

FOREIGN PATENT DOCUMENTS

| | | |
|---|---|---|
| EP | 1289197 | 3/2003 |

OTHER PUBLICATIONS

Information Sciences Institute University of Southern California, "Internet Protocol—DARPA Internet Program Protocol Specification," Prepared for Defense Advanced Research Projects Agency Information Processing Techniques Office, RFC 791, Sep. 1981, pp. i-iii, 1-45.

D. Johnson, et al. "Mobility Support in IPv6," IETF Mobile IP Working Group, Internet Draft, drift-ietf-mobileip-ipv6-24.txt, Jun. 30, 2003, pp. 1-172.

S. Deering, et al., "Internet Protocol, Version 6 (IPV6) Specification," Network Working Group, RFC 2460, Dec. 1998, pp. 1-39.

W. Simpson, "IP in IP Tunneling," Network Working Group, RFC 1853, Oct. 1995, pp. 1-8.

A. Conta, et al., "Generic Packet Tunneling in iv6 Specification," Network Working Group, RFC 2473, Dec. 1998, pp. 1-36.

V. Devarapalli, et al., "Nemo Basic Support Protocol," NEMO Working Group, Internet Draft, draft-ietf-nemo-basic-support-01.txt., Sep. 2003, pp. 1-13.

Chinese Office Action dated Mar. 12, 2010 with partial English translation.

PCT International Search Report dated Mar. 8, 2006.

* cited by examiner

HYBRID MOBILE COMMUNICATION SYSTEM COMPRISING MULTI-HOP-AD-HOC AND CIRCUIT-SWITCHED MODES

TECHNICAL FIELD

This invention relates to the technical field of the network including a mobile node such as a mobile host or a mobile router as a network component.

BACKGROUND ART

With the emergence and proliferation of wireless technology, the Internet today has evolved to a stage where numerous data communications end-points are made up of mobile terminals, each roaming through different domains and attaching itself to different points of attachment to the packet-switched data communications network (such as, the Internet) at different points in time. Such roaming provisioning is fairly matured in a circuit-switched communications network, such as the phone system. In a packet-switched communications network, however, supporting such roaming capabilities is difficult. This is because terminals in a packet-switched communications network are reached using unique addresses, and such addresses usually contain portions (usually the prefix) that must be valid in a spatial topology. In addition, it is desirable for mobile terminals to continue to be reached at the same address after a plurality of change of point of attachment to the packet-switched data communications network. This allows seamless continuation of sessions (such as file transfer) across different points of attachment to the packet-switched data communications network.

To support such roaming capabilities, the industry has developed solutions for mobility support as addressed by Mobile IPv4 [the following Non-patent document 1] in Internet Protocol version 4 (IPv4) [the following Non-patent document 2] and Mobile IPv6 [the following Non-patent document 3] in Internet Protocol version 6 (IPv6) [the following Non-patent document 4]. In Mobile IP, each data communications terminal (called a mobile node) has a permanent home domain. When the mobile node is attached to its home network, it is assigned a permanent global address known as a home-address. When the mobile node is away, i.e. attached to some other foreign networks, it is usually assigned a temporary global address known as a care-of-address. Such a temporary address is usually assigned by the access router the mobile node is associated to, and it is aggregated at the address topology of the access router so that the care-of-address is topologically correct in the routing infrastructure of the global network. The idea of mobility support is such that the mobile node can be reached at the home-address even when it is attached to other foreign networks, so that other nodes in the packet-switched data communications network need only identify the mobile node by the mobile node's home-address. This is done in Non-patent documents 1 and 3 with an introduction of an entity at the home network known as a home agent. Mobile nodes register their care-of-addresses with the home agents using messages known as Binding Updates. The home agent is responsible to intercept messages that are addressed to the mobile node's home-address, and forward the packet to the mobile node's care-of-address using IP-in-IP Tunneling [the following Non-patent documents 5 and 6]. IP-in-IP tunneling involves encapsulating an original IP packet in another IP packet. The original packet is sometimes referred to as the inner packet, and the new packet that encapsulates the inner packet is referred to as the outer packet. Such a binding between home-addresses and care-of-addresses, made known at the home agent of the mobile node, allows the mobile node to be reached no matter where the mobile node is.

It is possible to extend the concept of host mobility support as stipulated in Non-patent documents 1 and 3 to network mobility support (NEMO) as defined in the following Patent document 1 and the following Non-patent document 7. This is the case where the mobile node is itself a mobile router, and a plurality of nodes move together with the mobile router, forming a mobile network. Packets sent to the mobile network are intercepted by the home agent of the mobile router and tunneled to the mobile router, which decapsulates the tunnel packet, and forwards the inner packet to the destination. Similarly, packet sent from a node in the mobile network is tunneled to the home agent by the mobile router to be forwarded to the correct destination. The mobile router itself may act as an access router, allowing other mobile nodes (mobile hosts or mobile routers) to associate with the mobile router and gain access to the global communications network through the mobile router.

However, a system using the aforementioned mechanism has one fundamental requirement, that is, a mobile node must maintain link layer connectivity with the access router the mobile node associates with. Because the access router relays all packets sent to or from the mobile node, once the mobile node loses link layer connectivity with its access router, it can no longer send or receive packets. Thus, in such a kind of mobile network, the access architecture is hierarchical in nature, where a mobile node obtains its care-of-address from its access router, and must maintain connectivity with its access router.

There exists a mechanism utilizing mesh network protocols that allows a mobile node to forward packets to other mobile nodes within the same vicinity. Such a kind of mobile network is of a mesh nature, and typically employs Mobile Ad-Hoc Networks (MANET protocols). For example, the following Patent document 2,discloses a method for a mobile node to distribute link information to neighboring nodes, so that each mobile node can discover routes to any other mobile nodes in a mesh-like fashion. The following Patent document 3 discloses another example of a routing method where the associativity characteristic of neighboring links of a mobile node is used to disseminate routing information. In all this examples, two mobile nodes can send data packets to each other even if there is no link layer connectivity between them. The packet is sent via one or more intermediate nodes that do have link layer connectivity with each other. However, it remains unclear how a mobile node in a wireless mesh network can communicate with a node in the wired global communications network. To this end, the following patent document 4 has proposed a method where mobile nodes used Mobile IP to communicate with other nodes in the global network, and packets is relayed between the mobile node and an entity known as the Foreign Agent using MANET protocols.

Non-patent document 1: Perkins, C. E. et. al., "IP Mobility Support", IETF RCF 3344, August 2002.

Non-patent document 2: DARPA, "Internet Protocol", IETF RFC 791, September 1981.

Non-patent document 3: Johnson, D. B., Perkins, C. E., and Arkko, J., "Mobility Support in IPv6", IETF Internet Draft: draft-ietf-mobileip-ipv6-24.txt, Work In Progress, June 2003.

Non-patent document 4: Deering, S., and Hinden, R., "Internet Protocol Version 6 (IPv6) Specification", IETF RFC 2460, December 1998.

Non-patent document 5: Simpson, W., "IP in IP Tunneling", IETF RFC 1853, October 1995.

Non-patent document 6: Conta, A., and Deering, S., "Generic Packet Tunneling in IPv6", IETF RFC 2473, December 1998.

Non-patent document 7: Devarapalli, V., et. al., "NEMO Basic Support Protocol", IETF Internet Draft: draft-ietf-nemo-basic-01.txt, September 2003.

Patent document 1: Leung, K. K., "Mobile IP mobile router", U.S. Pat. No. 6,636,498, October 2003.

Patent document 2: Elliot, B. B., "Distribution of potential neighbor information through an ad hoc network", U.S. Pat. No. 6,456,599, September 2002.

Patent document 3: Toh, C. K. "Routing method for Ad-Hoc mobile networks", U.S. Pat. No. 5,987,011, November 1999.

Patent document 4: Airiksson, F., et. al., "Mobile IP for mobile Ad Hoc networks", US Patent Application 20010024443, September 2001.

The hierarchical architecture in Mobile IPv6 and NEMO is more efficient in the sense that there is no need for each mobile node to maintain a routing table and no need for flooding of route updates as required by MANET protocols. This is especially crucial since mobile nodes are usually resource limited and battery-powered, thus any saving in power consumptions and memory usage is significant.

However, these kinds of protocols (such as Mobile IPv6 or NEMO) require one or more access routers acting as the central node to forward packets. Any mobile node that associates to these access routers must maintain link layer connectivity with the access routers. If the mobile node wanders too far away, it will lose all connectivity. It cannot even communicate with another mobile node that is within its wireless range, because it can't forward packet to the access router that should then forward the packet to the destination node (that may be right beside the sender).

The mesh network protocols such as MANET specifically address this problem, allowing mobile nodes to form a dynamic mesh network, whereby mobile nodes may forward packets sent by other nodes that are not destined for themselves. Routes are either advertised proactively or discovered on-demand, giving mesh network nodes the ability to adapt dynamically to the changing structure of the mesh. This feature of mesh network is highly desirable, since the mesh network thus can be self-healing. However, mobile nodes using mesh network protocols will incur some deficiency. To send a packet, a mobile node must spend some time to discover routes to the destination. Mobile nodes also consume power even when they are not sending packets, since they must participate in relaying packets sent from other mobile nodes. In addition, some amount of route information must be maintained in the memory.

It is possible for an existing equipment to make use of both hierarchical and mesh architectures as a simple combination of two mechanisms. When a hierarchical mechanism fails, the above-mentioned equipment will switch to a mesh mechanism, and vice versa. However, such a simple combination of the two architectures will result in disruption of on-going transport session, mainly because the addresses used in each of two architectures are usually different.

DISCLOSURE OF THE INVENTION

To solve the problem listed above, the present invention combines the two architectures (hierarchical and mesh) to allow mobile nodes to operate in two different modes (the hierarchical mode and the mesh mode). In the hierarchical mode, the mobile node operates as per depicted by Mobile IP or NEMO protocols in that the packets sent by the mobile node are forwarded to the access router it is associated to for further delivery. Similarly, packets sent to the mobile node will reach its access routers (possibly forwarded by its home agent) and are then relayed to the mobile node. This occurs when the mobile node has link layer connectivity with its associated access routers. When such connectivity is lost, the mobile node will enter the mesh mode. In this mesh mode, packets sent by the mobile node are relayed to its access router by neighboring nodes of the mobile routers. Similarly, packets sent from the access router to the mobile node are relayed by neighboring nodes. This effectively creates virtual link layer connectivity between the mobile node and its access router, thereby maintaining the hierarchical architecture in the hierarchical mode.

If address spaces used in the hierarchical and mesh mode are different, as described in one embodiment of the present invention, an encapsulation scheme can be used in the mesh mode so that the packets sent using address in the hierarchical mode are encapsulated in a packet with the mesh mode address to be forwarded to the access router. This allows on-going transport session to be maintained without disruption. Also, a scheme is described in the following embodiment for mobile nodes and their access routers to discover each other's mesh mode addresses.

The present invention disclosed in this specification involves wireless mobile nodes operating in two distinct modes: the hierarchical mode and the mesh mode. In the hierarchical mode, the mobile node will employ standard wired node address aggregation and router selection. That is, they listen for router advertisements or beacon messages sent by their access routers, which may take the form of base stations or routers (mobile or fixed). From these router advertisements or beacon messages, the mobile node may automatically configure itself an address based on prefix information contained in these router advertisements or beacon messages. Alternatively, it can be delegated an address to use with the access routers based on technologies such as dynamic host configuration protocol (DHCP).

In this hierarchical mode, the mobile node will send packets to its peer through the access router. This may involve the normal IP operations, or the mobile node may in fact use Mobile IP or NEMO protocols to relay packets through its home agent. Packets sent to the mobile node (at the address configured or obtained as aforementioned) will arrive at the access router, which will then be forwarded to the mobile node.

In the event the mobile node loses link-layer connectivity with the access router, it will enter the mesh mode. In the mesh mode, it will attempt to discover the route to the access router through normal mesh-like mechanisms, such as MANET protocols. Once a route is discovered, it will send a packet to the access router to inform the access router it is now operating in the mesh mode. Alternatively, the mesh mode may be entered by an initiation from the access router. This happens when the access router needs to forward a packet to the mobile node, and discover that it has lost link-layer connectivity with the mobile node. The access router will then discover a route to the mobile node, and send a message informing the mobile node that the access router has entered the mesh mode.

In the mesh mode, communication between the access router and the mobile node will use mesh protocol to pass packets between them. Normal traffic sent to the mobile node's peer would be forwarded to the access router using mesh protocol. The access router then proceeds to forward the packet as per the hierarchical mode. When a packet arrives at the access router that is destined for the mobile node, the access router will forward the packet to the mobile node using mesh mechanism.

Recovery from the mesh mode to the hierarchical mode is achieved when the mobile node and the access router regain link-layer connectivity. Either of the nodes may detect this first, and send the other party a message to inform about the entering of hierarchical mode. Alternatively, the mobile node may wander near another access router. It detects this by the reception of a router advertisements or beacon messages from the new access router. The mobile node may then associates with this new access router, and enters into the hierarchical mode with this new access router.

According to the present invention comprising the foregoing construction, connection can be always maintained between the mobile node and the access router, and disruption of on-going transport session can be prevented by making effective use of two architectures (hierarchical and mesh architectures).

BEST MODE FOR CARRYING OUT THE INVENTION

Figure 1:
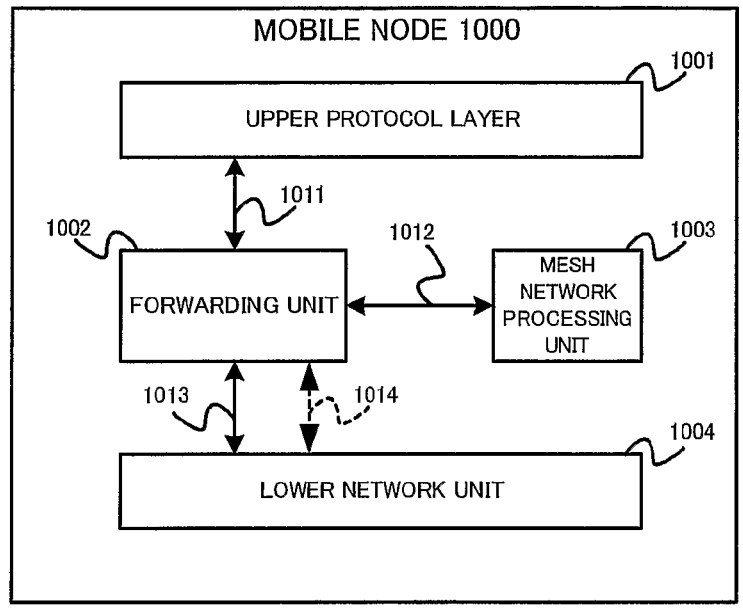
FIG. 1 is a diagram showing architecture of a mobile node in the first embodiment of the present invention.

A system and associated apparatuses and methods for mobile nodes to communicate in a hybrid fashion of the hierarchical mode and the mesh mode in a packet-switched data communications network are disclosed in this specification. To help understand the disclosed invention, the following definitions are used:

(i) A "packet" is a self-contained unit of data of any possible format that could be delivered on a data network. A "packet" normally consists of two portions: a "header" portion and a "payload" portion. The "payload" portion contains data that are to be delivered, and the "header" portion contains information to aid the delivery of the packet. A "header" must have a source address and a destination address to respectively identify the sender and recipient of the "packet".

(ii) A "packet tunneling" refers to a self-contained packet being encapsulated into another packet. The act of "packet tunneling" is also referred to as "encapsulation" of packets. The packet that is being encapsulated is referred to as the "tunneled packet" or "inner packet". The packet that encapsulates the "inner packet" is referred to as the "tunneling packet" or "outer packet". Here, the entire "inner packet" forms the payload portion of the "outer packet".

(iii) A "mobile node" is a network element that changes its point of attachment to the global data communications network. It may be used to refer to an end-user terminal, or an intermediate network element that serves as a gateway, a router, or an intelligent network hub that can change its point of attachment to the global data communications network.

The "mobile node" that is an end-user terminal is more specifically referred to as a "mobile host"; whereas the "mobile node" that is an intermediate network element that serves as a gateway, a router, or an intelligent network hub is more specifically referred to as a "mobile router".

(iv) A "default router" of a network element refers to a router residing on the same link of the network element where all packets originated from the network element with a destination that the network element has no other known route to reach are forwarded to.

(v) An "access router" of a mobile node refers to a router which the mobile node associates with to attach to the data communications network. It is usually the default router of the mobile node. An access router of a mobile node may itself be mobile.

(vi) A 'hierarchical mode of operation' refers to mobile node passing a packet to its default routers for forwarding when there is no explicit routing information known to the mobile node specifying how to forward that packet given its destination. In the hierarchical mode, packets are transmitted between two nodes directly (in a manner of direct one hop forwarding). The term 'hierarchical mode' is sometimes used in this specification to mean 'hierarchical mode of operation'.

(vii) A 'mesh mode of operation' refers to mobile node discovering the next hop node to forward a packet to when there is no explicit routing information known to the mobile node specifying how to forward that packet given its destination. Such discovering of routes can be achieved by requiring every mobile node to actively broadcast information periodically on their reachability to their neighboring nodes, or by sending a probe packet to discover which neighboring nodes can reach a particular destination whenever the mobile node needs to send a packet to a destination. An example will be to use mesh network protocols to forward the packet, such as MANET protocols. In the mesh mode, packets are transmitted between two nodes indirectly (through multiple-hop in a mobile ad-hoc network fashion). The term 'mesh mode' is sometimes used in this document to mean 'mesh mode of operation'.

(viii) Both in the hierarchical mode and mesh mode, packets are forwarded through intermediate nodes. The difference is that in the hierarchical mode, the intermediate nodes always include the default router of the mobile node, whereas in the mesh mode, the intermediate node varies depending on the destination.

In the following description, for purpose of explanation, specific numbers, times, structures, and other parameters are set forth in order to provide a thorough understanding of the present invention. However, it will be apparent to anyone skilled in the art that the present invention may be practiced without these specific details.

First Embodiment

Figure 2:
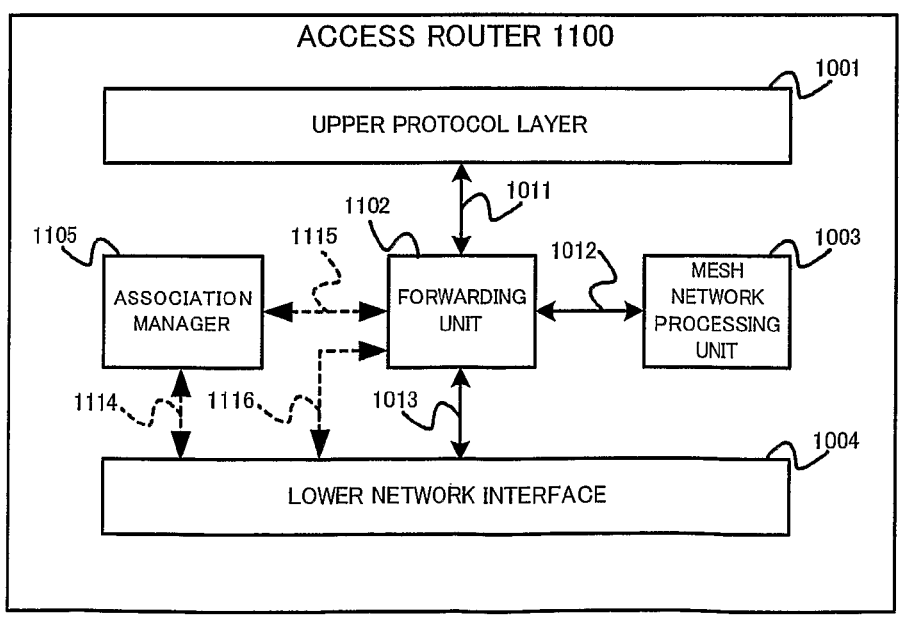
FIG. 2 is a diagram showing architecture of an access router in the first embodiment of the present invention.
Figure 3:
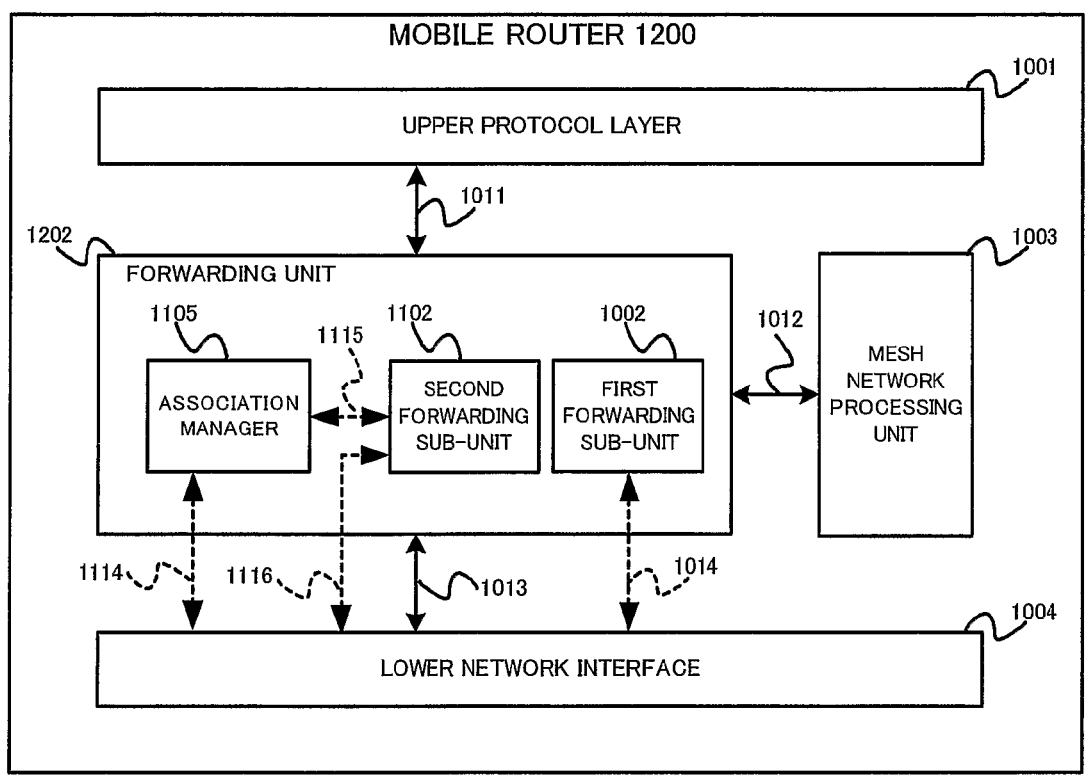
FIG. 3 is a diagram showing architecture of a mobile router in the first embodiment of the present invention.

In the first embodiment of this invention, a mobile node 1000, an access router 1100 and a mobile router 1200 deployed in a general wireless mobile network attached to a global packet-switched data communications network are disclosed. FIGS. 1 to 3 show the architectures of the mobile node 1000, the access router 1100 and the mobile router 1200, respectively. Within these architectures, functional blocks providing identical functionalities are given identical reference numerals. Architecture of the mobile node 1000 comprises an Upper Layer Protocol 1001, a Forwarding Unit 1002, a Mesh Network Processing Unit 1003, and a single or plurality of Lower Network Interface 1004. Architecture of an access router 1100 comprises an Upper Layer Protocol 1001, a Forwarding Unit 1102, a Mesh Network Processing Unit 1003, a single or plurality of Lower Network Interface 1004, and an Association Manager 1105. Architecture of a mobile router 1200 is a hybrid of a mobile node 1000 and an access router 1100, comprising an Upper Layer Protocol 1001, a Forwarding Unit 1202, a Mesh Network Processing Unit 1003, and a single or plurality of Lower Network Interface 1004.

A Lower Network Interface 1004 is a collective block to refer to the physical network interface hardware, the software controlling the hardware, and the protocols that govern the communications through such hardware. For example, under the ISO (International Organization for Standardization)'s OSI (open systems interconnection) model, the Lower Network Interface 1004 will include all protocols relating to the Physical and Data Link layers. Although the present invention targets mobile nodes with usually a single wireless network interface, it should be apparent to anyone skilled in the art that the same mechanism as one of the present invention can be extended to mobile nodes with multiple wireless access mechanisms or to hybrid nodes with both wireless and wired network interfaces.

Similarly, the functional block Upper Protocol Layer 1001 is an abstraction to include all upper layer protocols and applications that transmit and receive data packets via the Forwarding Unit 1002 and Lower Network Interface 1004. Using the ISO's OSI model as an example again, the Upper Protocol Layer 1001 will include the Application, Presentation, Session and Transport layers.

The Mesh Network Processing Unit 1003 handles data packets that convey information related to the mesh network protocol(s) it is designed to handle. The Mesh Network Processing Unit 1003 is also responsible for appropriately selecting a mesh architecture using protocol (mesh network protocol) and a hierarchical architecture using protocol (mobile IPv6 or NEMO) for applying to data packets by capsulations and decapsulating data packets in which a mesh network protocol is used. The Mesh Network Processing Unit 1003 is also responsible for routing packets that are meant to be forwarded using the associated mesh network protocol. In addition, routing information of the neighboring nodes in the mesh network is also maintained by the Mesh Network Processing Unit 1003 as per required by the associated mesh network protocol(s). The Mesh Network Processing Unit 1003 typically implements MANET protocol.

The Forwarding Unit 1002 of the mobile node 1000 is responsible for making decisions on how to handle a data packet that is passed from the Upper Protocol Layer 1001 via the data path 1011, passed from the Mesh Network Processing Unit 1003 via the data path 1012, or passed from one of the Lower Network Interface 1004 via the data path 1013, and for forwarding the data packet. If the hardware of the network interfaces supports it, a signal path 1014 connected from the Lower Network Interface 1004 to the Forwarding Unit 1002 is used to inform the Forwarding Unit 1002 when the link layer connection with the currently associated access router has been broken, and also when the link layer connection with an access router (possible newly associated or previously associated) is restored.

Whenever the link layer connection with the access router is up (that is, connected), the Forwarding Unit 1002 will set an internal memory to indicate it is in the hierarchical mode. Whenever the link layer connection with the access router is down (that is disconnected), the Forwarding Unit 1002 will set the internal memory to indicate it is in the mesh mode. There exist many methods to detect whether the link layer connection with the access router is up or down. One method is made use of the hardware available in Lower Network Interface 1004 that can detect channel status between the mobile node 1000 and its access router. Another method is for the Forwarding Agent to listen to router advertisement messages sent out periodically by access routers. For instance in IPv6, routers are required to send out at least one router advertisement messages in a time interval of x seconds (x being a non-zero positive number). Thus the Forwarding Unit 1002 can deduce that it has lose connection with its access router if it did not receive any router advertisement message from the access router which the mobile node 1000 is attached to within a time interval of 2× seconds. The Forwarding Unit 1002 will then enter the mesh mode. Once the Forwarding Unit 1002 detects a router advertisement message from the access router that the mobile node 1000 is attached to, it will enter the hierarchical mode. Notice this will work even when the mobile node 1000 changes its attached access router. This also happens when a router advertisement from another router is received, and the mobile node 1000 chooses to attach with this new access router. Then the reception of the next router advertisement from this new access router, the Forwarding Unit 1002 will enter into the hierarchical mode, since 'a router advertisement from the access router which the mobile node 1000 is attached to' is received.

Whenever the mobile node 1000 enters the mesh mode, it is necessary for the mobile node 1000 to inform the access router which it is associated to (say, access router 1100) that it is using the mesh mode to pass packet to the access router. This can be done by sending the access router 1100 a special packet (using mesh network protocols) that contains at least the following information:

(a) an unique identifier identifying the mobile node 1000;

(b) an unique identifier identifying the access router 1100; and (c) a message identifier representing the entrance into the mesh mode.

The unique identifiers preferably can be the IP addresses of the mobile node 1000 and access router 1100, or other form of identifiers defined otherwise. This allows the access router 1100 to also use the mesh mode when forwarding packets to the mobile node 1000. Similarly, whenever the mobile node 1000 leaves the mesh mode to enter to the hierarchical mode, the mobile node 1000 should send a message to the access router 1100. This can be done by sending the access router 1100 a special packet that contains at least the following information:

(a) an unique identifier identifying the mobile node 1000;

(b) an unique identifier identifying the access router 1100; and (c) a message identifier representing the exit from mesh mode.

Often, the link layer transport mechanism (i.e. Lower Network Interface 1004) will store unsent data packets, or packets that are not acknowledged in an internal buffer (an internal data buffer). This allows the Lower Network Interface 1004 to continue attempting to retransmit packets to the next hop destination (i.e. the access router). However, when the node enters the mesh mode, such internal data buffer is no longer necessary, since the next hop destination (access router) can no longer be reached. Thus, the Forwarding Unit 1002 can send a signal to Lower Network Interface 1004 via signal path 1014 to instruct the Lower Network Interface 1004 to flush the internal buffer whenever the mobile node 1000 enters the mesh mode. The above-mentioned internal data buffer can act as a packet buffer for retransmitting when the node enters the mesh mode, and packets in the internal data buffer can be retransmitted using the mesh mode after entering the mesh mode.

Figure 4:
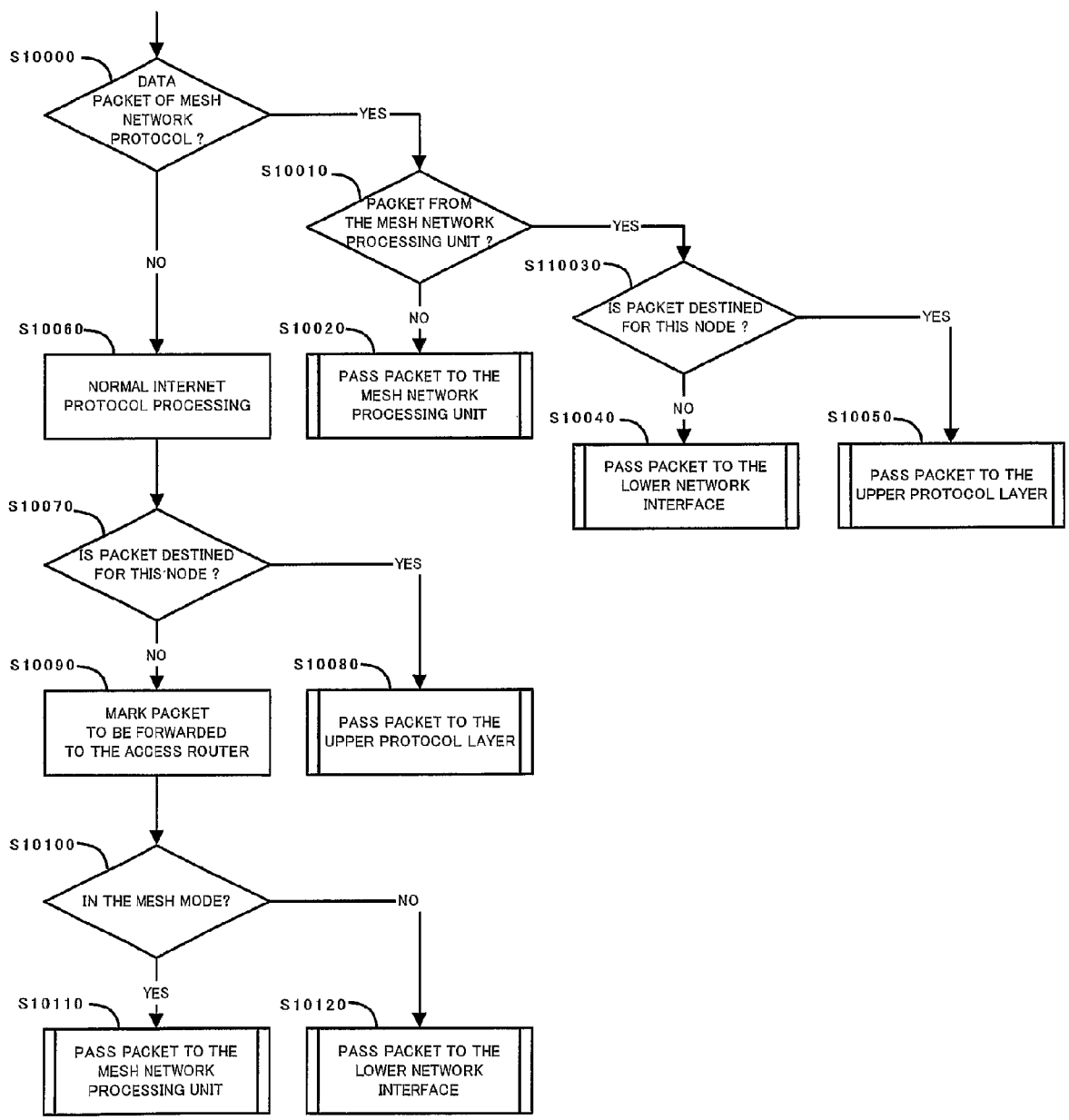
FIG. 4 is a flowchart showing processing which a Forwarding Unit of a mobile node performs in the first embodiment of the present invention.

FIG. 4 shows the flowchart for the processing of a data packet carried out by the Forwarding Unit 1002 in the first embodiment of the present invention. A data packet may arrive at the Forwarding Unit 1002 either from Upper Protocol Layer 1001, Mesh Network Processing Unit 1003 or Lower Network Interface 1004. In step S10000, the packet is first checked if it is mesh network protocol related. This can be done by looking for specific port number, protocol number or any other kinds of special markings in the header of the packet that indicate that it is a mesh network protocol data packet. If so, in step S10010, the data packet is checked if it is passed to the Forwarding Unit 1002 from the Mesh Network Processing Unit 1003. If yes, the Mesh Network Processing Unit 1003 has already performed the necessary processing on the packet, and in step S110030, the packet is checked if it is addressed to this node (the mobile node 1000). The packet is passed to the Upper Protocol Layer 1001 if the packet is addressed to the mobile node 1000 (as shown in step S10050). Otherwise, the packet is passed to the Lower Network Interface 1004 (step S10040) after necessary Internet Protocol processing is carried out for transmission. If the packet is not from the Mesh Network Processing Unit 1003, the packet is passed to the Mesh Network Processing Unit 1003 for processing, as shown in step S10020. It is preferable that the mesh Network Processing Unit 1003, receiving the packet addressed to the other node from the Forwarding Unit 1002, checks if this mobile node 1000 has link layer connectivity with the access router 1100, and changes the packet back to the normal IP packet by, for example, decapusulating the data packet of the mesh network protocol if so.

When the packet is not detected to be a mesh network protocol related packet, normal Internet Protocol (version 4 or 6) processing is carried out in step S10060. If the packet is not discarded due to Internet Protocol processing, it is checked if the packet is addressed to the mobile node 1000 in the step S10070. If so, the packet is passed to the Upper Protocol Layer 1001 in step S10080. Else, the packet is marked to be forwarded to the access router of the mobile node 1000 (step S10090). The Forwarding Unit 1002 then checks if it is in the hierarchical or mesh mode in step S10100. If it is in the hierarchical mode, the packet is passed to the Lower Network Interface 1004 for transmission in step S10120 after necessary Internet Protocol processing is carried out for transmission. If it is in the mesh mode, mesh network protocol will be used to forward the packet to the access router. This is done by passing the packet to the Mesh Network Processing Unit 1003 in step S10110.

The Association Manager 1105 of the access router 1100 manages the association of mobile nodes. The simplest way of implementing the Association Manager 1105 is to use a relational structure of memory locations to form a table of associations. Each row in the table contains information of an associated mobile node, at least containing (a) unique identifier of the mobile node, possibly the IP address, and (b) communication mode, mesh or hierarchical. If the hardware of the network interfaces supports it, a signal path 1114 is connected between the Lower Network Interface 1004 and the Association Manager 1105 This is used to inform the Association Manager 1105 the link layer connection status of associated mobile nodes so that the Association Manager 1105 can update the table accordingly. In addition, as the above-mentioned, the mobile node 1000 will send its access router special packets to indicate it has entered the mesh/ hierarchical mode. Reception of these special packets is also used to update the Association Manager 1105.

Again, the Lower Network Interface 1004 may store unsent data packets, or packets that are not acknowledged in an internal buffer (an internal data buffer). This allows the Lower Network Interface 1004 to continue attempting to retransmit packets to the next hop destination (i.e. the mobile node). However, when the communication with the mobile node enters the mesh mode, unacknowledged packets stored in the internal data buffer is no longer necessary, since the next hop destination (the mobile node) can no longer be reached. Thus, the Forwarding Unit 1102 can send a signal to the Lower Network Interface 1004 via signal path 1116 to instruct the Lower Network Interface 1004 to remove packets destined to the mobile node from the internal buffer whenever communication with the mobile node enters the mesh mode. These packets can be passed from the Lower Network Interface 1004 back to the Forwarding Unit 1102 for retransmission using the mesh mode.

The Forwarding Unit 1102 of the access router 1100 is responsible for making decisions on how to handle a data packet that is passed from the Upper Protocol Layer 1001 via the data path 1011, passed from the Mesh Network Processing Unit 1003 via the data path 1012, and passed from one of the Lower Network Interface 1004 via the data path 1013, and for forwarding the data packet. Furthermore, the Forwarding Unit 1102 is responsible for carrying out normal Internet Protocol processing. A signal path 1115 connected from the Association Manager 1105 to the Forwarding Unit 1102 is used for the Forwarding Unit 1102 to query the link layer connection status with a given associated mobile node: whether it is up or down (connected or disconnected). This is used to aid the Forwarding Unit 1102 in making forwarding decision.

Figure 5:
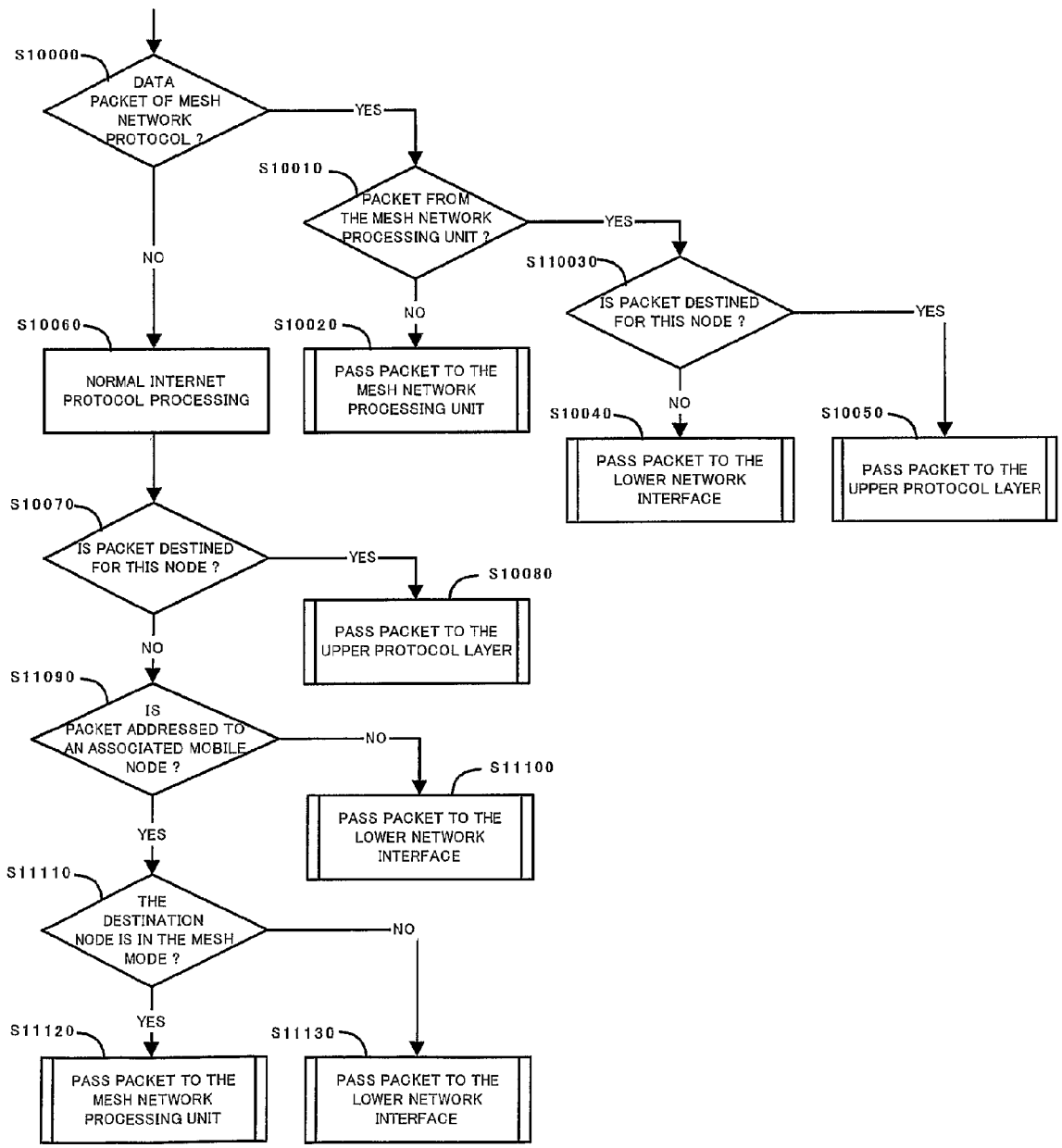
FIG. 5 is a flowchart showing processing which a Forwarding Unit of an access router performs in the first embodiment of the present invention.

FIG. 5 shows the flowchart for the processing of a data packet carried out by the Forwarding Unit 1102 of the access router 1200. Steps that are identical to those in FIG. 4 are given the same reference numeral, and descriptions thereof are omitted. Basically, the steps from S10000 through S10080 are identical. The difference is when the packet is not destined for the access router in step S10070, the decision flow will branch to step S11090, where the destination of the packet is further checked to see if it is a mobile node that is associated with the access router 1100. This can be done by querying the Association Manager 1105. If the destination is not an associated mobile node (No in step S11090), the packet is forwarded to the Lower Network Interface 1004 for transmission in step S11100 after necessary Internet Protocol processing is carried out for packet transmission. Else, the current connectivity mode of communication with the mobile node is checked in step S11110. If the connectivity mode is hierarchical, the packet can be sent directly to the mobile node. Thus in step S11130, the packet is forwarded to the Lower Network Interface 1004 for transmission after necessary Internet Protocol processing is carried out for packet transmission. If the connectivity mode is mesh, then the packet must be forwarded to the mobile node in a mesh network fashion. Thus in step S11120, the packet is forwarded to the Mesh Network Processing Unit 1003.

The Forwarding Unit 1202 of the mobile router 1200 is essentially a sum of the packet forwarding functionality of the Forwarding Unit 1002 of the mobile node 1000 and the packet forwarding functionality to the ingress network of the Forwarding Unit 1102 of the access router 1100. The Forwarding Unit 1202 consists of the First Forwarding Sub-Unit 1002, which handles outgoing packets that need to be forwarded to the access router of the mobile router 1200. This First Forwarding Sub-Unit 1002 is basically identical in functionality with the Forwarding Unit 1002 of the mobile node 1000, and thus is given the same reference numeral. There is also the Second Forwarding Sub-Unit 1102 and the Association Manager 1105, which handle packets that need to be forwarded to mobile nodes that are attached to the mobile router 1200. These have functionalities that are identical to the Forwarding Unit 1102 and the Association Manager 1105 of the access router 1100, and thus are given the same reference numerals. Furthermore, the Forwarding Unit 1202 consists of the functionality of normal Internet Protocol processing as the First and Second Forwarding Sub-Units 1002 and 1102. In FIG. 3, the First and Second Forwarding Sub-Units 1002 and 1102 are illustrated as separate components, they can be implemented in the same hardware with the same function and processing united. Also, the First and Second Forwarding Sub-Units 1002 and 1102 can cooperate with each other, and exchange packets with each other. Detail descriptions of these sub-components are also omitted to reduce duplication.

The Forwarding Unit 1202 of the mobile router 1200 can be considered as a combination of the Forwarding Unit (First Forwarding Sub-Unit) 1002 of the mobile node 1000 and the Forwarding Unit (Second Forwarding Sub-Unit) 1102 of the access router 1100. When the mobile router 1200 performs packet processing, the Forwarding Unit 1202 checks if the destination address of the packet is located within its ingress network (that is, whether the destination is a mobile node which is attached to the mobile router 1200 or not). When the destination address of the packet is located within its ingress network, the packet will be passed to the Second Forwarding Sub-Unit 1102 for further processing. The processing logic of the Second Forwarding Sub-Unit 1102 will follow that described in FIG. 5. When the destination address of the packet is not located within its ingress network, the packet will need to be sent to the access router of the mobile router 1200, and then the packet is passed to the First Forwarding Sub-Unit 1002 for further processing. The processing logic of the First Forwarding Sub-Unit 1002 will follow that described in FIG. 4.

The functionality of the above Forwarding Unit 1202 of the mobile router 1200 can be put into the following. The Forwarding Unit 1202 of the mobile router 1200 basically performs the same packet processing as flowchart shown in FIG. 5. The access router 1100 always can use the hierarchical protocol against a packet sent from the egress interface, however, the mobile router 1200 needs to appropriately choose the use of the hierarchical protocol or the mesh protocol even against a packet sent from the egress interface. In other words, the mobile router 1200 needs to convert the packet of the hierarchical protocol to be sent to the access router 1100 into the packet of the mesh network protocol when the mobile router 1200 has no link layer connection with the access router 1100. In this case, the mobile router 1200 needs to determine whether the egress interface of the mobile router 1200 is in the hierarchical or mesh mode by performing the same processing as step S10100 in FIG. 4

Since the Forwarding Units of the mobile node, the access router and the mobile router perform various processing closely related to normal Internet Protocol processing, it is described in this specification as if each of the Forwarding Units has the functionality of normal Internet Protocol processing and then performs normal Internet protocol processing. However, the functionality of normal Internet protocol processing can separate from each of the Forwarding Units. For example, it is possible that the functionality of normal Internet Protocol processing is disposed between the Upper Protocol Layer and the Lower Network Interface and the new Forwarding Unit is arranged for forwarding processing different from normal Internet Protocol processing.

Figure 6:
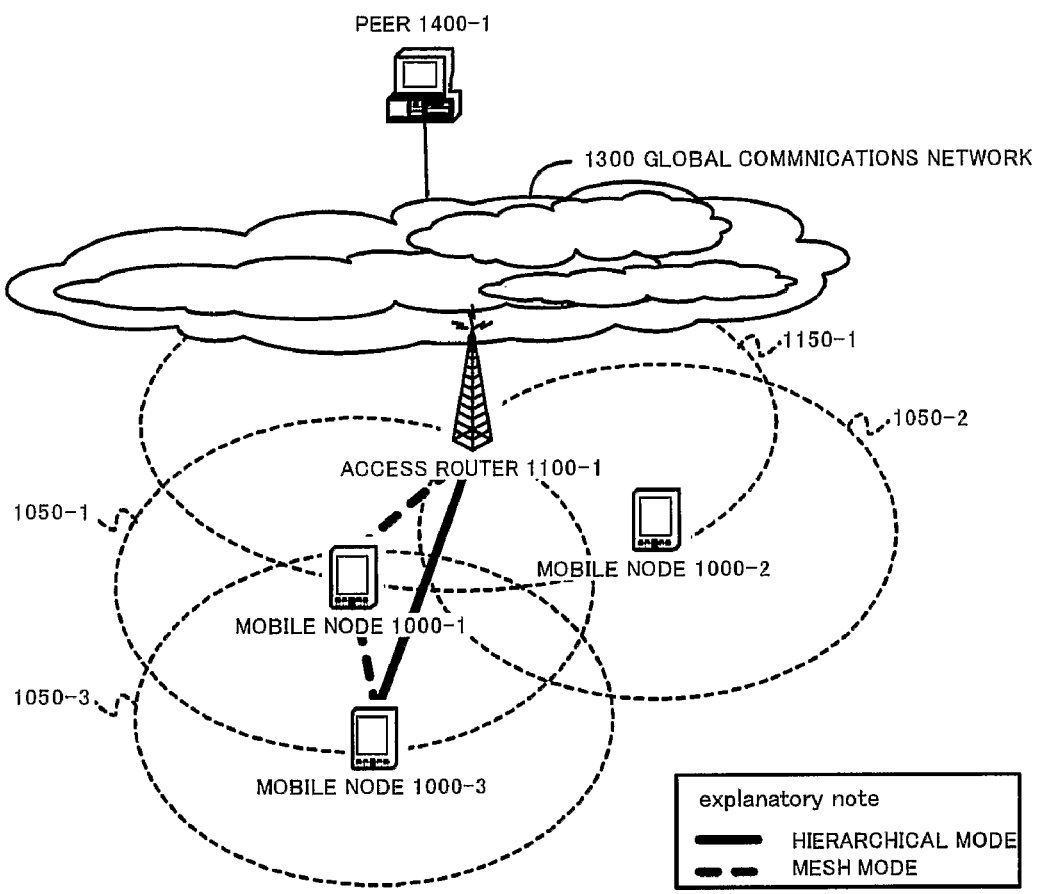
FIG. 6 is a diagram showing the first example of system architecture in the first embodiment of the present invention.

FIG. 6 illustrates a simple deployment scenario. The mobile nodes 1000-1, 1000-2, and 1000-3 are all attached to the access router 1100-1. The dotted ellipses 1050-1, 1050-2, 1050-3 and 1150-1 show the wireless operating range of the mobile nodes 1000-1, 1000-2, 1000-3 and the access router 1100-1 respectively. The mobile node 1000-3 is having an active session with wired node peer 1400-1 when it moves out of the operating range of the access router 1100-1 (this situation is illustrated in FIG. 6). Under normal wireless deployment, the session between the mobile node 1000-3 and the peer 1400-1 cannot be maintained. However, with the apparatus disclosed in this invention deployed, the mobile node 1000-3 will detect that its link layer connection with the access router 1100-1 is broken. In this case, the mobile node 1000-3 will enter the mesh mode, and send a message to the access router 1100-1 informing that it has entered the mesh mode. Thereafter, packets sent by the mobile node 1000-3 to the peer 1400-1 will be forwarded using mesh network protocol to the access router 1100-1 via the mobile node 1000-1. From the access router 1100-1, the packet will be routed through the global communications network 1300 to the peer 1400-1. Similarly, packets sent from the peer 1400-1 to the mobile node 1000-3 are routed to the access router 1100-1. From there, the access router 1100-1 checks that the mobile node 1000-3 is in the mesh mode, and thus forwards packets using mesh network protocol (i.e. via the mobile node 1000-1).

Figure 7:
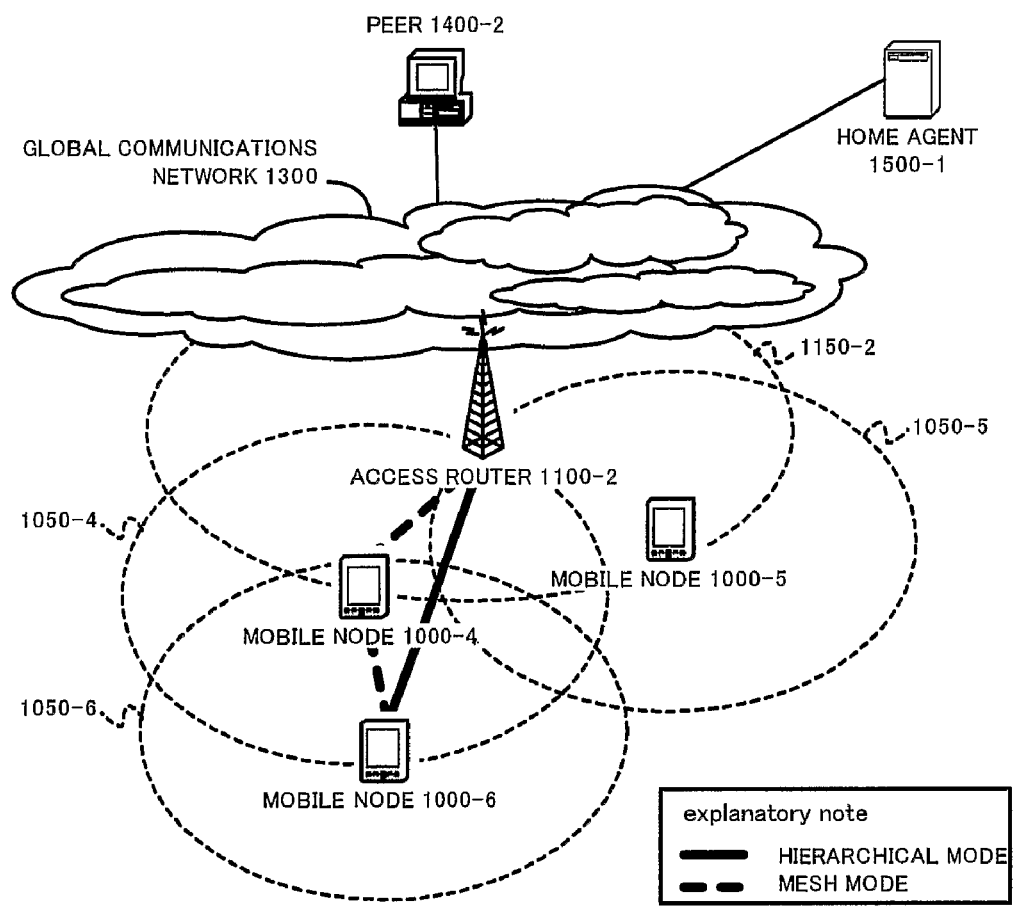
FIG. 7 is a diagram showing the second example of system architecture in the first embodiment of the present invention.

One can extend the deployment scenario to a system when mobile nodes employ Mobile IP to communicate with nodes on the global communication network 1300. This is illustrated in FIG. 7. Here, the mobile nodes 1000-4, 1000-5 and 1000-6 are all attached to the access router 1100-2. The dotted ellipses 1050-4, 1050-5, 1050-6 and 1150-2 show the wireless operating range of the mobile nodes 1000-4, 1000-5, 1000-6 and the access router 1100-2 respectively. The home agent 1500-1 is acting as the home agent for the mobile node 1000-6. The mobile node 1000-6 gets a care-of-address from the access router 1100-2 when it is attached to the access router 1100-2. When the mobile node 1000-6 is within operating range of the access router 1100-2, it will encapsulate a packet sent to peer 1400-2 to the home agent 1500-1. Similarly, when the peer 1400-2 sends a packet to the mobile node 1000-6, the packet will be routed to the home agent 1500-1. The home agent 1500-1 then encapsulates this packet, and forwards it to the care-of-address of the mobile node 1000-6. When the mobile node 1000-6 moves out of the operating range of the access router 1100-2, the mobile node 1000-6 will detect that its link layer connection with the access router 1100-2 is broken (this situation is illustrated in FIG. 7). In this case, the mobile node 1000-6 will enter the mesh mode, and send a message to the access router 1100-2 informing that it has entered the mesh mode. Thereafter, packets sent from the mobile node 1000-6 to the peer 1400-2 will be first encapsulated to the home agent 1500-1, and the entire packet is forwarded to the access router 1100-2 using mesh network protocol (via the mobile node 1000-4). From the access router 1100-2, the packet will be routed to the home agent 1500-1, where it is decapsulated and the inner packet is forwarded to the peer 1400-2. Similarly, when the peer 1400-2 sends the mobile node 1000-6 a packet, the packet will be intercepted by the home agent 1500-1 and encapsulated to the mobile node 1000-6. This packet will reach the access router 1100-2, where it is discovered that the mobile node 1000-6 is in the mesh mode. The packet is thus forwarded to the mobile node 1000-6 using mesh network protocol (via the mobile node 1000-4).

Figure 8:
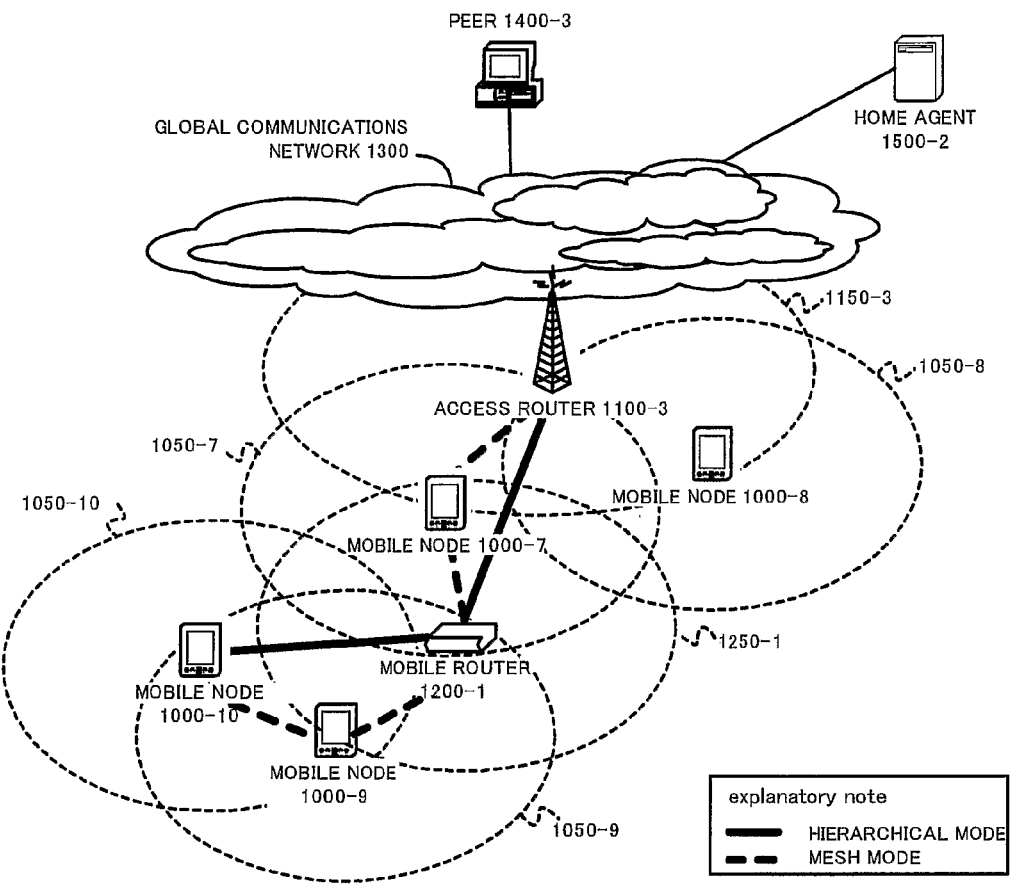
FIG. 8 is a diagram showing the third example of system architecture in the first embodiment of the present invention.

This Mobile IP scenario can be further extended to include Network Mobility, as shown in FIG. 8. Here, the mobile nodes 1000-7, 1000-8 and the mobile router 1200-1 are attached to the access router 1100-3. The mobile nodes (mobile network nodes) 1000-9 and 1000-10 are attached to the mobile router 1200-1. The dotted ellipses 1050-7, 1050-8, 1050-9, 1050-10, 1150-3 and 1250-1 show the wireless operating range of the mobile nodes 1000-7, 1000-8, 1000-9, 1000-10, the access router 1100-3, and the mobile router 1200-1 respectively. The home agent 1500-2 is the home agent of the mobile router 1200-1. The mobile node 1000-9 is communicating with the peer 1400-3. When the mobile router 1200-1 is within operating range of the access router 1100-3, a packet sent by the mobile node 1000-9 to the peer 1400-3 will go through the following path: (a) the packet is forwarded to the mobile router 1200-1, (b) the mobile router 1200-1 encapsulates the packet to be tunneled to the home agent 1500-2, (c) the entire packet is forwarded to the access router 1100-3, (d) the packet is routed through the global communications network 1300 to reach the home agent 1500-2, and (e) the home agent 1500-2 decapsulates the packet and sends the inner packet to the peer 1400-3. A packet sent by the peer 1400-3 will follow the reverse path: (a) the packet is intercepted by the home agent 1500-2, (b) the home agent 1500-2 encapsulates the packet to be tunneled to the mobile router 1200-1, (c) the entire packet is routed through the global communications network 1300 to reach the access router 1100-3, (d) the access router 1100-3 forwards the packet to the mobile router 1200-1, and (e) the mobile router 1200-1 decapsulates the packet and forwards the inner packet to the mobile node 1000-9.

When the mobile router 1200-1 moves out of the operating range of the access router 1100-3, the mobile router 1200-1 will detect that its link layer connection with the access router 1100-3 is broken (this situation is illustrated in FIG. 8). In this case, the mobile router 1200-1 will enter the mesh mode, and send a message to the access router 1100-3 informing that it has entered the mesh mode. Thereafter, a packet sent from the mobile node 1000-9 to the peer 1400-3 will follow the following path: (a) the packet is forwarded to the mobile router 1200-1, (b) the mobile router 1200-1 encapsulates the packet to be tunneled to the home agent 1500-2, (c) the entire packet is forwarded to the access router 1100-3 using mesh network protocol, (d) the mobile node 1000-7 will relay the packet in mesh network protocol, (e) the packet is routed through the global communications network 1300 to reach the home agent 1500-2, and (f) the home agent 1500-2 decapsulates the packet and sends the inner packet to the peer 1400-3. A packet sent by the peer 1400-3 will follow the reverse path: (a) the packet is intercepted by the home agent 1500-2, (b) the home agent 1500-2 encapsulates the packet to be tunneled to the mobile router 1200-1, (c) the entire packet is routed through the global communications network 1300 to reach the access router 1100-3, (d) the access router 1100-3 forwards the packet to the mobile router 1200-1 using mesh network protocol, (e) the mobile node 1000-7 will relay the packet in mesh network protocol, and (f) the mobile router 1200-1 decapsulates the packet and forwards the inner packet to the mobile node 1000-9.

In FIG. 8, it is also possible for the disclosed invention to be used in the ingress network of the mobile router 1200-1. When the mobile node 1000-10 wanders too far away from the mobile router 1200-1, it will lose link layer connectivity with the mobile router 1200-1 (this situation is illustrated in FIG. 8). When this happens, the mobile node 1000-10 can enter the mesh mode, and packets forwarded between the mobile node 1000-10 and the mobile router 1200-1 will be relayed through the mobile node 1000-9 using mesh network protocol.

Thus, according to a system and associated apparatuses and methods disclosed within the first embodiment of this invention, a node in the mobile communicating system can more effectively communicate with one another by switching between the hierarchical and mesh modes as and when necessary.

Second Embodiment

In the second embodiment of this invention, a special extension of the above system, apparatuses and methods in the first embodiment are disclosed. In the first embodiment, no assumption is made on the address space partitioning when the mobile nodes use standard Internet Protocols and when the mobile nodes use mesh network protocols. In practical deployments of mobile communications network, it is usually preferable to use distinct address spaces, one for standard Internet Protocols, and one for mesh network protocols. The second embodiment caters for the case when separate address spaces are used.

Figure 9:
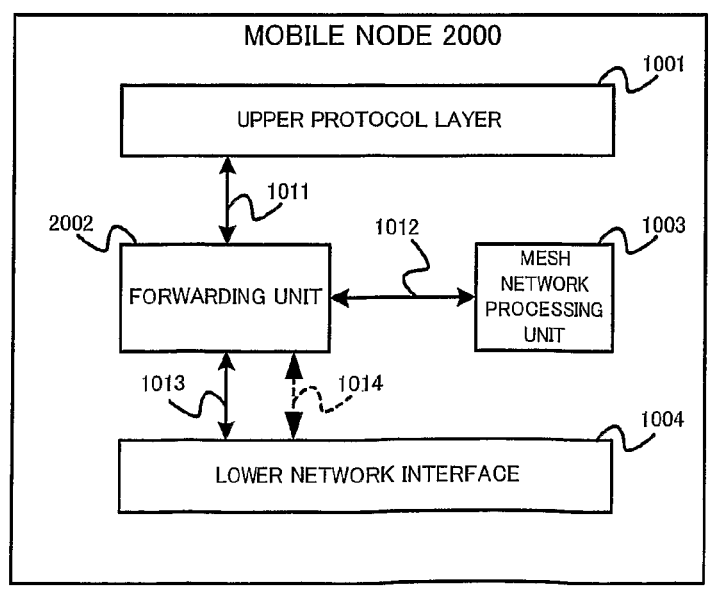
FIG. 9 is a diagram showing architecture of a mobile node in the second embodiment of the present invention.
Figure 10:
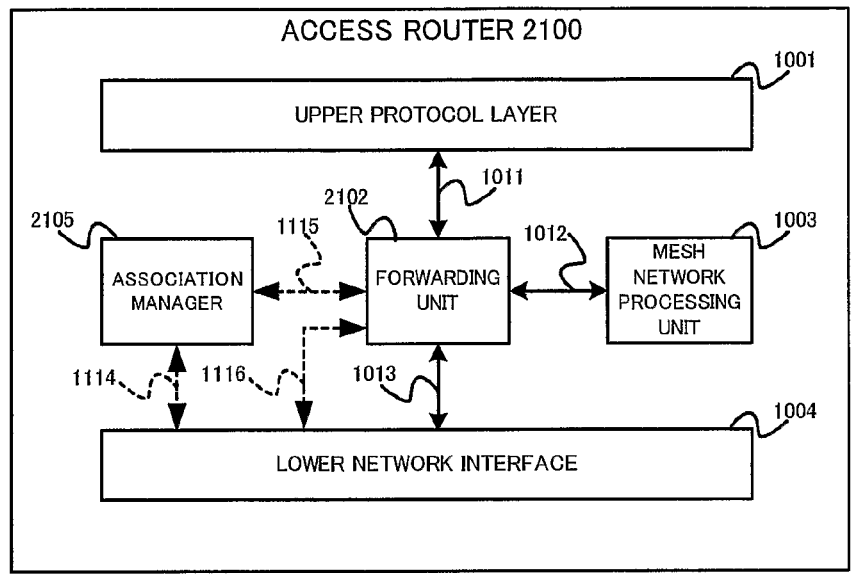
FIG. 10 is a diagram showing architecture of an access router in the second embodiment of the present invention.
Figure 11:
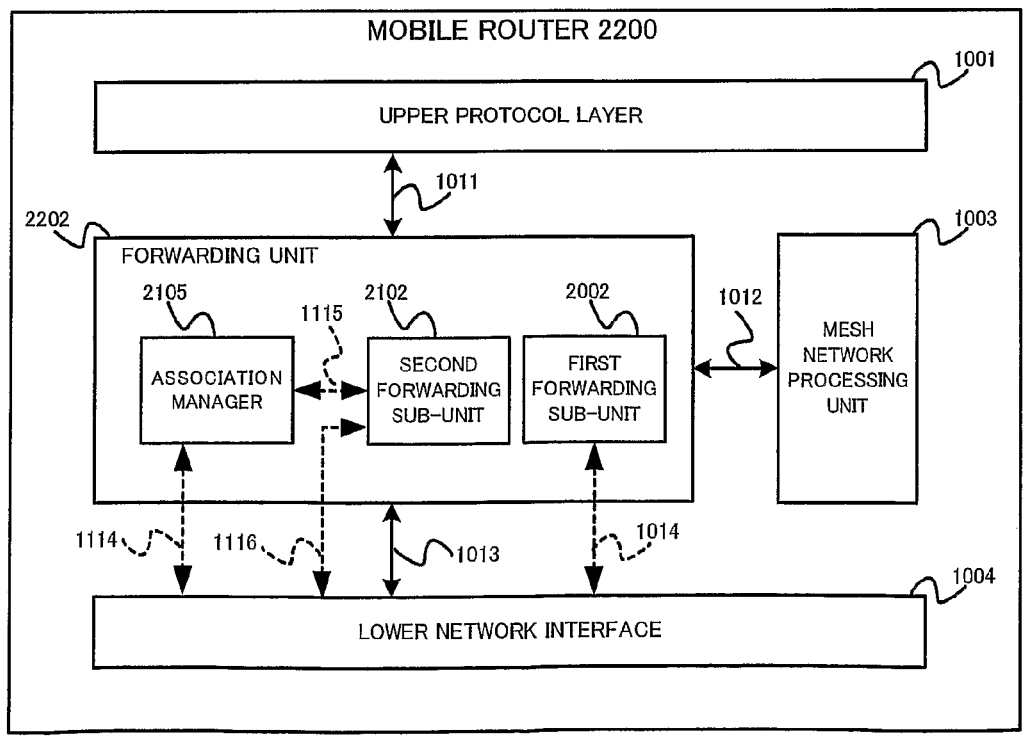
FIG. 11 is a diagram showing architecture of a mobile router in the second embodiment of the present invention.

In the second embodiment of this invention, a mobile node 2000, an access router 2100 and a mobile router 2200 deployed in a general wireless mobile network attached to a global packet-switched data communications network are disclosed. FIGS. 9 to 11 show the architectures of the mobile node 2000, the access router 2100 and the mobile router 2200, respectively. Within these architectures, functional blocks providing identical functionalities are given identical reference numerals. In addition, some functional blocks have identical functionalities as those described in the first embodiment. These are given the same reference numerals, and descriptions thereof are omitted.

Architecture of the mobile node 2000 comprises an Upper Layer Protocol 1001, a Forwarding Unit 2002, a Mesh Network Processing Unit 1003 and a single or plurality of Lower Network Interface 1004. Architecture of the access router 2100 comprises an Upper Layer Protocol 1001, a Forwarding Unit 2102, a Mesh Network Processing Unit 1003, a single or plurality of Lower Network Interface 1004 and an Association Manager 2105. Architecture of the mobile router 2200 is a hybrid of the mobile node 2000 and the access router 2100, comprising an Upper Layer Protocol 1001, a Forwarding Unit 2202, a Mesh Network Processing Unit 1003 and a single or plurality of Lower Network Interface 1004. Most of these are identical to those described in the first embodiment. In fact, the only difference lies in the Forwarding Units 2002, 2102 and 2202 which are largely similar to that of Embodiment 1 except for the need to cater for the use of different address spaces in mesh mode and in hierarchical mode. To reduce duplication, the description in the second embodiment will only focus on these differences.

In essence, the use of different address spaces means that the mobile nodes are globally reachable with a global address, which they use normally. However, when they communicate using mesh network protocol, they need to use a separate address, typically with a unique prefix that indicate it is in a mesh network. Thus, each node in a mesh network will have at least two addresses: a global address and a mesh network address. For mobile nodes using Mobile IP or NEMO extensions, they will have at least three addresses: home address, care-of address, and mesh network address. Note that home address and care-of address are global address and are used in the hierarchical mode. Mesh network address can only be use in the mesh mode.

To let other nodes learn of their mesh network addresses, there are many mechanisms available for nodes to use. For instance, when access routers broadcast router advertisements, they can attach special options to the advertisements that indicate their mesh network addresses. Hence when a mobile node receives the router advertisement, it can learn the mesh network address of the access router. When the mobile node attaches to the access router, the mobile node can also let the access router know its own mesh network address. Alternatively, the mesh network address can also be queried by sending a special packet to the global address of a node, and the node will reply with its mesh network address.

In addition, to let mobile nodes know what are the prefixes to be used for the global addresses or mesh network addresses, the routers (both access routers and mobile routers) would preferably insert options into router advertisements that indicate the prefixes and whether the prefixes are used for global addressing or for mesh network addressing.

Hence, when a mobile node is in the hierarchical mode, it will use its global address and send packets normally. When it is in the mesh mode, it needs to change the source and destination addresses to its mesh network counterpart. It can do so by encapsulating the packet in a new packet with the source address equal to its mesh network address, and the destination address equal to the access router's mesh network address. This packet is then forwarded to the access router using mesh network protocol. Similarly, when the access router receives a packet that is addressed to a mobile node's global address and finds that the mobile node is in the mesh mode, the access router can encapsulate the packet in a new packet with the source address equal to the access router's mesh network address, and the destination address equal to the mobile node's mesh network address. This packet is then forwarded to the mobile node using mesh network protocol.

Figure 12:
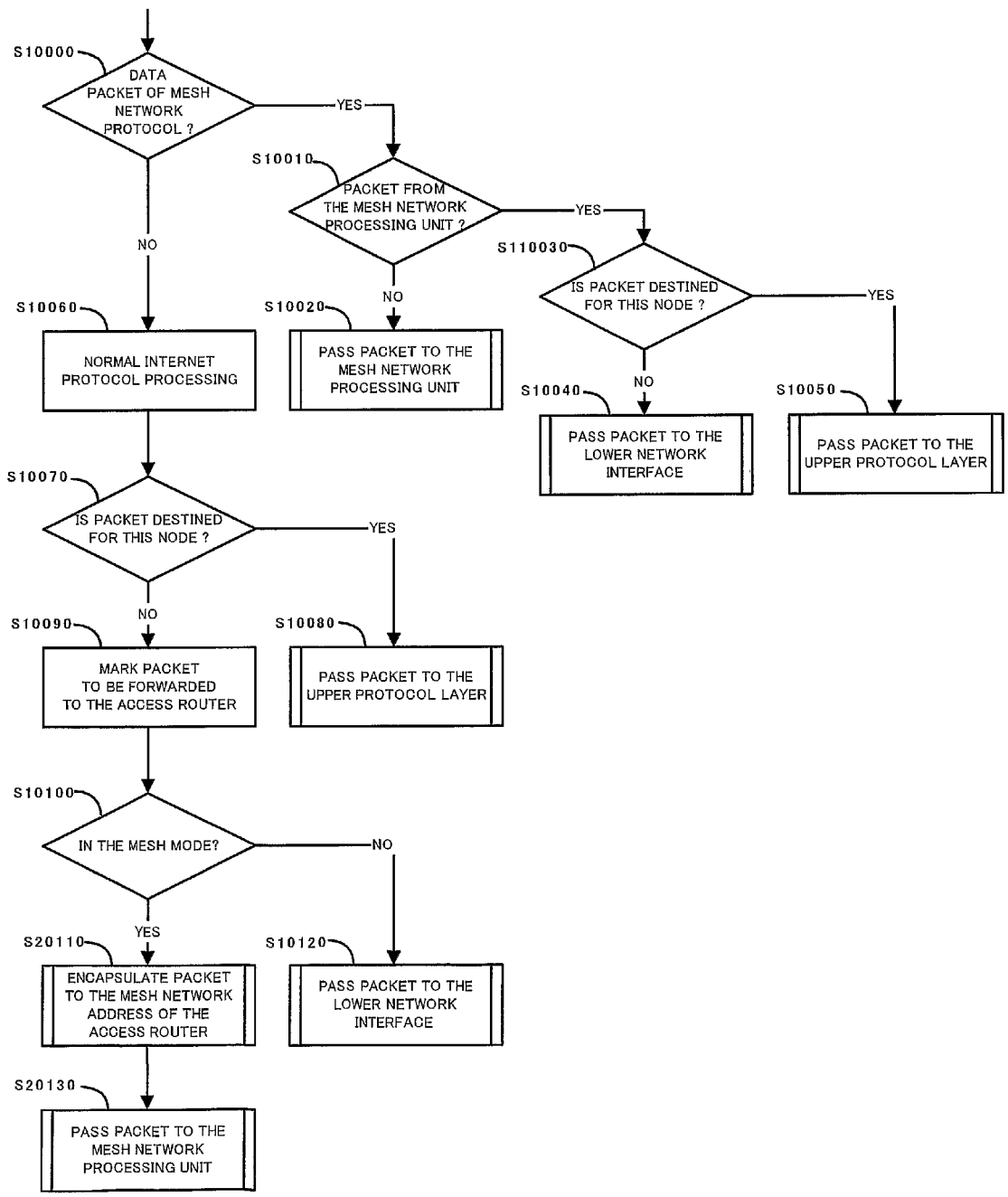
FIG. 12 is a flowchart showing processing which a Forwarding Unit of a mobile node performs in the second embodiment of the present invention.

FIG. 12 shows the flowchart for the processing of a data packet carried out by the Forwarding Unit 2002 of the mobile node 2000 in the second embodiment of the present invention. Most of the steps in FIG. 12 are similar to those as described in the descriptions of the Forwarding Unit 1002 of the first embodiment. Those steps that are identical are given the same reference numeral and descriptions of these steps are henceforth omitted. The difference is when the Forwarding Unit 2002 checked if it is in the hierarchical or mesh mode in step S10100, and found that it is in the mesh mode (Yes in step S10100). The Forwarding Unit 2002 then proceeds to step S20110 where the packet is encapsulated in a new packet. The new packet has the source address equal to the mesh network address of the mobile node 2000 and the destination address equal to the mesh network address of the access router of mobile node 2000. The new packet is then passed to the Mesh Network Processing Unit 1003 in step S20130.

The Association Manager 2105 of the access router 2100 manages the association of the mobile nodes, and is largely similar to the Association Manager 1105 as described in the first embodiment. The difference is that in addition to storing the unique identifier and the communication mode (mesh or hierarchical) of associated mobile nodes, it also needs to store the mesh network addresses of the associated mobile nodes. Hence, if the implementation of the Association Manager 2105 is to use a relational structure of memory locations to form a table of associations, each row in the table will at least contain (a) unique identifier of the mobile node, possibly the IP address, (b) communication mode (mesh or hierarchical) and (c) the mesh network address of the mobile node.

Figure 13:
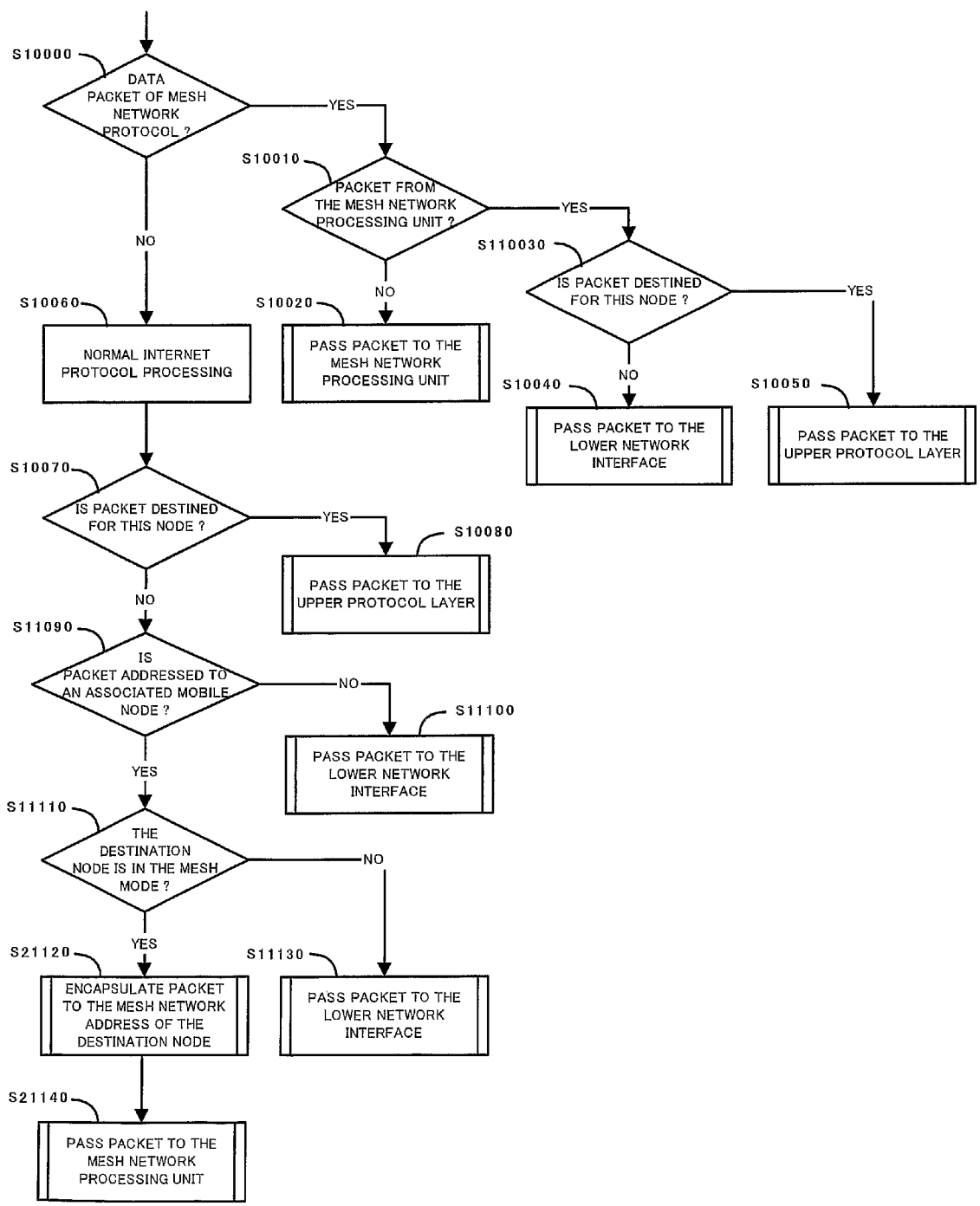
FIG. 13 is a flowchart showing processing which a Forwarding Unit of an access router performs in the second embodiment of the present invention.

The Forwarding Unit 2102 of the access router 2100 is also largely similar to the Forwarding Unit 1102 as described in the first embodiment. FIG. 13 shows the difference in packet processing of the Forwarding Unit 2102. Most of the steps are similar to those as described in the descriptions of the Forwarding Unit 1102 of the first embodiment. Those steps that are identical are given the same reference numeral and descriptions of these steps are henceforth omitted. The difference is when the Forwarding Unit 2102 checked if the destination of a packet is in the hierarchical or mesh mode in step S11110, and found that it is in the mesh mode (Yes in step S11110). The Forwarding Unit 2102 then proceeds to step S21120 where the packet is encapsulated in a new packet. The new packet has the source address equal to the mesh network address of the access router 2100 and the destination address equal to the mesh network address of the original destination. The new packet is then passed to the Mesh Network Processing Unit 1003 in step S21140.

The Forwarding Unit 2202 of the mobile router 2200 is essentially a sum of the packet forwarding functionality of the Forwarding Unit 2002 of the mobile node 2000 and the packet forwarding functionality to the ingress network of the Forwarding Unit 2102 of the access router 2100. The forwarding Unit 2102 consists of the First Forwarding Sub-Unit 2002, which handles outgoing packets that need to be forwarded to the access router of the mobile router 2200. This First Forwarding Sub-Unit 2002 is basically identical in functionality with the Forwarding Unit 2002 of the mobile node 2000, and thus is given the same reference numeral. There is also the Second Forwarding Sub-Unit 2102 and the Association Manager 2105, which handle packets that need to be forwarded to mobile nodes that are attached to the mobile router 2200. These have functionalities that are identical to the Forwarding Unit 2102 and the Association Manager 2105 of the access router 2100, and thus are given the same reference numerals. Furthermore, the Forwarding Unit 2202 consists of the functionality of normal Internet Protocol processing as the First and Second Forwarding Sub-Units 2002 and 2102. In FIG. 11, the First and Second Forwarding Sub-Units 2002 and 2102 are illustrated as separate components, they can be implemented in the same hardware with the same function and processing united. Also, the First and Second Forwarding Sub-Units 2002 and 2102 can cooperate with each other, and exchange packets with each other. Detail descriptions of these sub-components are also omitted to reduce duplication.

The Forwarding Unit 2202 of the mobile router 2200 can be considered as a combination of the Forwarding Unit (First Forwarding Sub-Unit) 2002 of the mobile node 2000 and the Forwarding Unit (Second Forwarding Sub-Unit) 2102 of the access router 2100. When the mobile router 2200 performs packet processing, the Forwarding Unit 2202 checks if the destination address of the packet is located within its ingress network (that is, whether the destination is a mobile node which is attached to the mobile router 2200 or not). When the destination address of the packet is located within its ingress network, the packet will be passed to the Second Forwarding Sub-Unit 2102 for further processing. The processing logic of the Second Forwarding Sub-Unit 2102 will follow that described in FIG. 13. When the destination address of the packet is not located within its ingress network, the packet will need to be sent to the access router of the mobile router 2200, and then the packet is passed to the First Forwarding Sub-Unit 2002 for further processing. The processing logic of the First Forwarding Sub-Unit 2002 will follow that described in FIG. 12.

The functionality of the above Forwarding Unit 2202 of the mobile router 2200 can be put into the following. The Forwarding Unit 2202 of the mobile router 2200 basically performs the same packet processing as flowchart shown in FIG. 13. The access router 2100 can always use the hierarchical protocol against a packet sent from the egress interface, however, the mobile router 2200 needs to appropriately choose the use of the hierarchical protocol or the mesh protocol even against a packet sent from the egress interface. In other words, the mobile router 2200 needs to convert the packet of the hierarchical protocol to be sent to the access router 2100 into the packet of the mesh network protocol when the mobile router 2200 has no link layer connection with the access router 2100. In this case, the mobile router 2200 needs to determine whether the egress interface of the mobile router 2200 is in the hierarchical or mesh mode by performing the same processing as step S10100 in FIG. 12.

Figure 14:
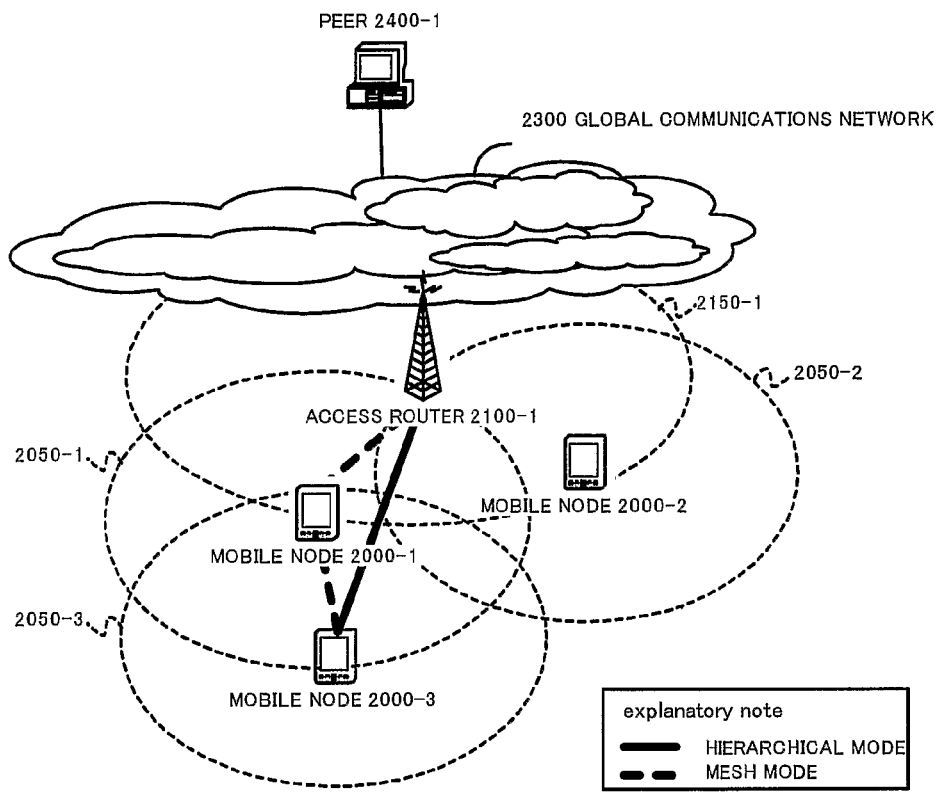
FIG. 14 is a diagram showing the first example of system architecture in the second embodiment of the present invention.
Figure 15:
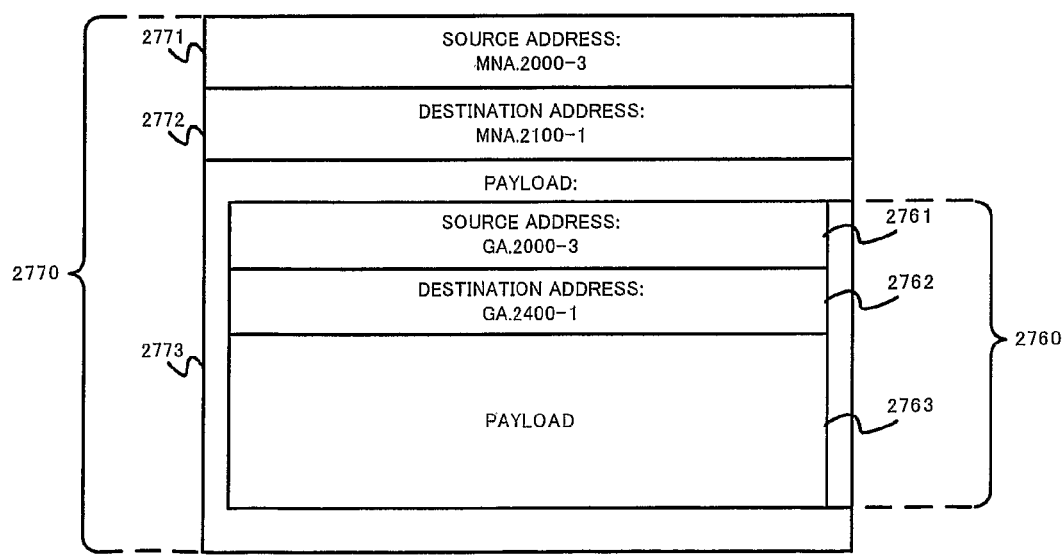
FIG. 15 is a diagram showing an example of packet format used in the mesh mode in the system architecture of FIG. 14.

FIG. 14 shows a simple deployment scenario. The mobile nodes 2000-1, 2000-2 and 2000-3 are all attached to the access router 2100-1. The dotted ellipses 2050-1, 2050-2, 2050-3 and 2150-1 show the wireless operating range of the mobile nodes 2000-1, 2000-2, 2000-3, and the access router 2100-1 respectively. The mobile node 2000-3 is having an active session with wired node peer 2400-1 when it moves out of the operating range of the access router 2100-1 (this situation is illustrated in FIG. 14). Under normal wireless deployment, the session between the mobile node 2000-3 and the peer 2400-1 cannot be maintained. However, with the apparatus disclosed in this invention deployed, the mobile node 2000-3 will detect that its link layer connection with the access router 2100-1 is broken. In this case, the mobile node 2000-3 will enter the mesh mode, and send a message to the mesh network address of the access router 2100-1 informing the access router 2100-1 that it has entered the mesh mode. Thereafter, packets sent by the mobile node 2000-3 to the peer 2400-1 will be encapsulated in a new packet forwarded to mesh network address of the access router 2100-1 via mobile node 2000-1. FIG. 15 shows the packet sent in the mesh mode. The original packet 2760 has the source address 2761 equal to GA.2000-3 (the global address of the mobile node 2000-3) and the destination address 2762 equal to GA.2400-1 (the global address of the peer 2400-1). This packet 2760 forms the payload 2773 of the outer packet 2770, with the source address 2771 equal to MNA.2000-3 (the mesh network address of the mobile node 2000-3) and the destination address 2772 equals to MNA.2100-1 (the mesh network address of the access router 2100-1).

From the access router 2100-1, the packet 2760 is decapsulated from the packet 2770 and routed through the global communications network 2300 to the peer 2400-1. Similarly, a packet sent from the peer 2400-1 to the mobile node 2000-3 is routed to access router 2100-1. From there, the access router 2100-1 checks that mobile node 2000-3 is in the mesh mode, and thus encapsulates the packet in a new one to be forwarded to the mesh network address of the mobile node 2000-3 via mobile node 2000-1.

Figure 16:
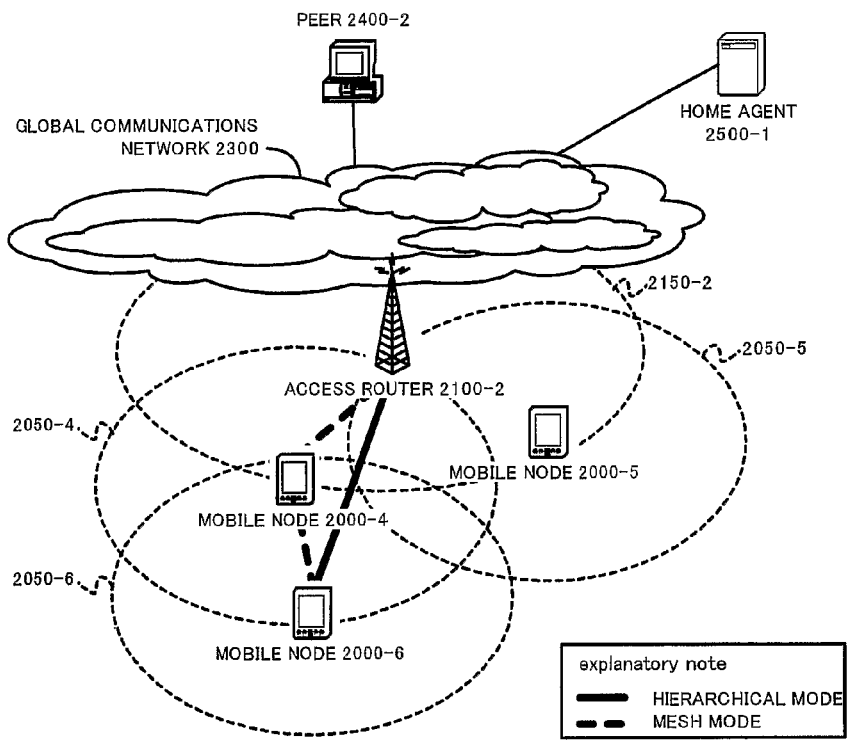
FIG. 16 is a diagram showing the second example of system architecture in the second embodiment of the present invention.
Figure 17:
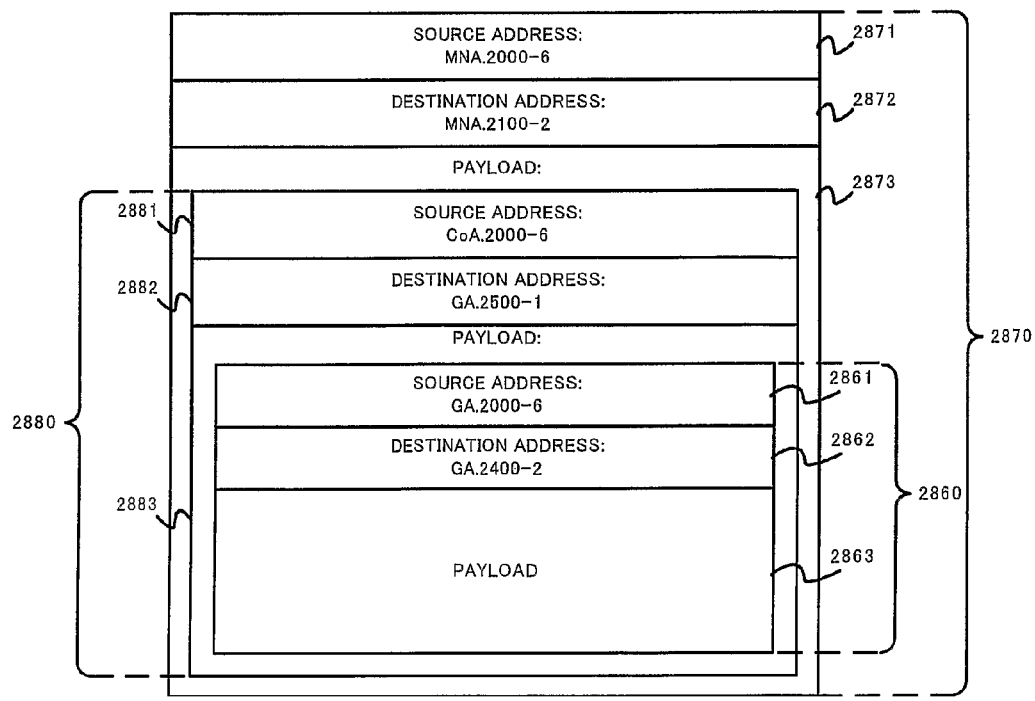
FIG. 17 is a diagram showing an example of packet format used in the mesh mode in the system architecture of FIG. 16.

One can extend the deployment scenario to a system where mobile nodes employ Mobile IP to communicate with nodes on the global communication network 2300. This is illustrated in FIG. 16. Here, the mobile nodes 2000-4, 2000-5 and 2000-6 are all attached to the access router 2100-2. The dotted ellipses 2050-4, 2050-5, 2050-6 and 2150-2 show the wireless operating range of the mobile nodes 2000-4, 2000-5, 2000-6 and the access router 2100-2 respectively. The home agent 2500-1 is acting as the home agent for the mobile node 2000-6. The mobile node 2000-6 gets a care-of-address (say, equals to CoA.2000-6) from the access router 2100-2 when it attaches to the access router 2100-2. When the mobile node 2000-6 is within operating range of the access router 2100-2, it will encapsulate a packet sent to the peer 2400-2 to the home agent 2500-1. Similarly, when the peer 2400-2 sends a packet to the mobile node 2000-6, the packet will be routed to the home agent 2500-1. The home agent 2500-1 then encapsulates this packet, and forwards it to the care-of-address of the mobile node 2000-6. This operation is as per specified by Mobile IP. When the mobile node 2000-6 moves out of the operating range of the access router 2100-2, the mobile node 2000-6 will detect that its link layer connection with the access router 2100-2 is broken (this situation is illustrated in FIG. 16). In this case, the mobile node 2000-6 will enter the mesh mode, and send a message to the access router 2100-2 informing that it has entered the mesh mode. Thereafter, packets sent from the mobile node 2000-6 to the peer 2400-2 will be first encapsulated to the home agent 2500-1, and the entire packet is further encapsulated in another packet forwarded to the mesh network address of the access router 2100-2. FIG. 17 shows the packet sent in the mesh mode. The original packet 2860 has the source address 2861 equal to GA.2000-6 (the global address of the mobile node 2000-6) and the destination address 2862 equals to GA.2400-2 (the global address of the peer 2400-2). This packet 2860 forms the payload 2883 of the next outer packet 2880, with the source address 2881 equal to CoA.2000-6 (the care-of-address of the mobile node 2000-6) and the destination address 2882 equal to GA.2500-1 (the global address of the home agent 2500-1). The packet 2880 is further encapsulated as the payload 2873 of the outermost packet 2870, with the source address 2871 equal to MNA.2000-6 (the mesh network address of the mobile node 2000-6) and the destination address 2872 equal to MNA.2100-2 (the mesh network address of the access router 2100-2).

The entire packet 2870 is forwarded to the access router 2100-2 using mesh network protocol via the mobile node 2000-4. From the access router 2100-2, the packet 2880 is decapsulated from the packet 2870 and routed to the home agent 2500-1, where the original packet 2860 is decapsulated from the packet 2880 and forwarded to the peer 2400-2. Similarly, when the peer 2400-2 sends the mobile node 2000-6 a packet, the packet will be intercepted by the home agent 2500-1 and encapsulated to the mobile node 2000-6. This packet will reach the access router 2100-2, where it is discovered that the mobile node 2000-6 is in the mesh mode. The packet is thus encapsulated in a packet and forwarded to the mesh network address of the mobile node 2000-6 using mesh network protocol (via the mobile node 2000-4).

Figure 18:
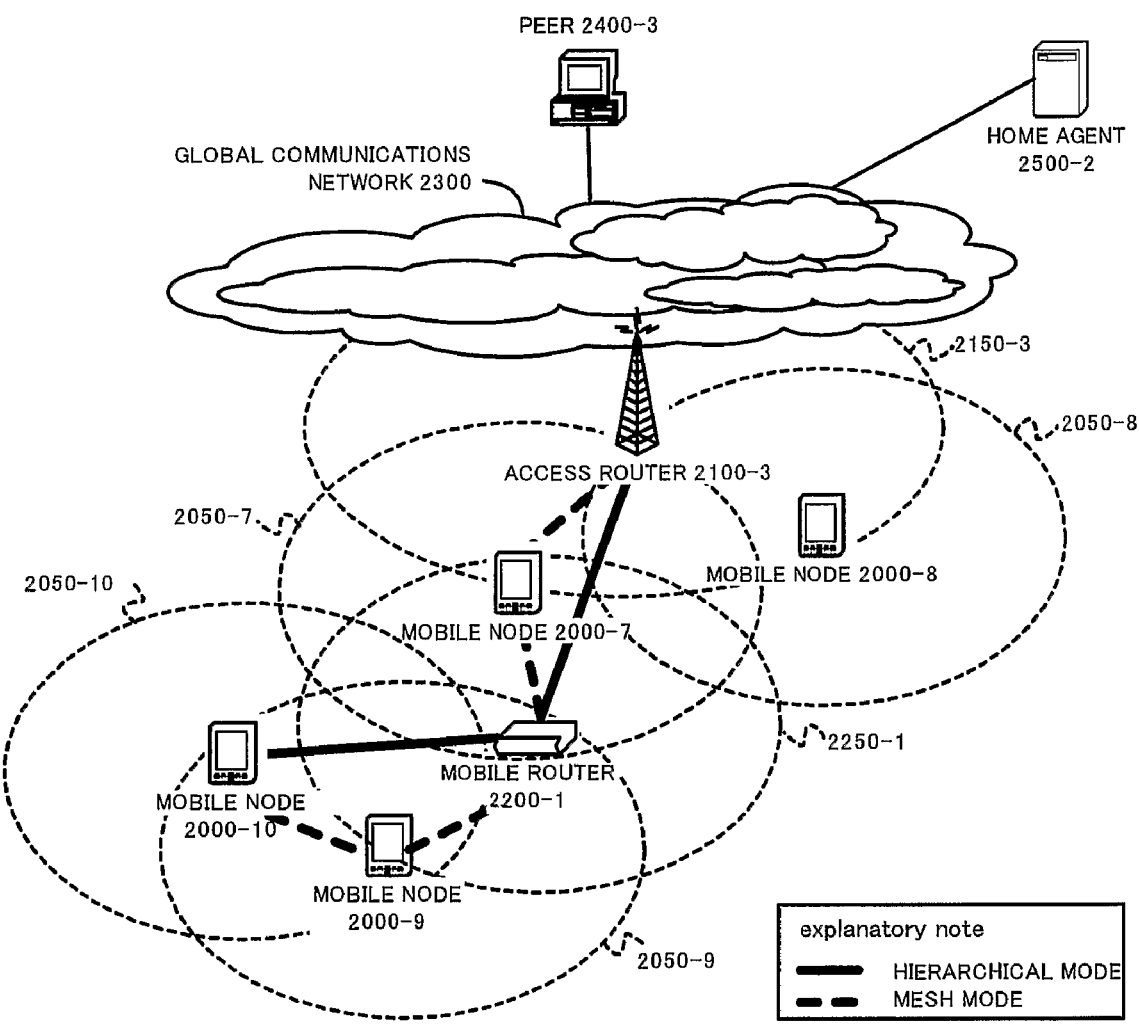
FIG. 18 is a diagram showing the third example of system architecture in the second embodiment of the present invention.

This Mobile IP scenario can be further extended to include Network Mobility, as shown in FIG. 18. Here, the mobile nodes 2000-7, 2000-8 and the mobile router 2200-1 are attached to the access router 2100-3. The mobile nodes 2000-9 and 2000-10 are attached to the mobile router 2200-1. The home agent 2500-2 is the home agent of the mobile router 2200-1. The dotted ellipses 2050-7, 2050-8, 2050-9, 2050-10, 2150-3 and 2250-1 show the wireless operating range of the mobile nodes 2000-7, 2000-8, 2000-9, 2000-10, the access router 2100-3 and the mobile router 2200-1 respectively. The mobile node 2000-9 is communicating with the peer 2400-3. When the mobile router 2200-1 is within operating range of the access router 2100-3, a packet sent by the mobile node 2000-9 to the peer 2400-3 will go through the following path: (a) the packet is forwarded to mobile router 2200-1, (b) the mobile router 2200-1 encapsulates the packet to be tunneled to the home agent 2500-2, (c) the entire packet is forwarded to the access router 2100-3, (d) the packet is routed through the global communications network 2300 to reach the home agent 2500-2, and (e) the home agent 2500-2 decapsulates the packet and sends the inner packet to the peer 2400-3. A packet sent by the peer 2400-3 will follow the reverse path: (a) the packet is intercepted by the home agent 2500-2, (b) the home agent 2500-2 encapsulates the packet to be tunneled to the mobile router 2200-1, (c) the entire packet is routed through the global communications network 2300 to reach the access router 2100-3, (d) the access router 2100-3 forwards the packet to the mobile router 2200-1, and (e) the mobile router 2200-1 decapsulates the packet and forwards the inner packet to the mobile node 2000-9. This sequence is as per specified by the network mobility support of Mobile IP.

When mobile router 2200-1 moves out of the operating range of the access router 2100-3, the mobile router 2200-1 will detect that its link layer connection with the access router 2100-3 is broken (this situation is illustrated in FIG. 18). In this case, mobile router 2200-1 will enter the mesh mode, and send a message to access router 2100-3 informing that it has entered the mesh mode. The message is sent using mesh network protocol, and addressed to the mesh network address of access router 2100-3. Thereafter, the packet 2960 (shown in FIG. 19 described later) sent from the mobile node 2000-9 to the peer 2400-3 will follow the following path: (a) the packet 2960 is forwarded to the mobile router 2200-1, (b) the mobile router 2200-1 encapsulates the packet 2960 into a new packet 2990 to be tunneled to the home agent 2500-2, (c) the entire packet 2990 is further encapsulated in the packet 2970 addressed to the mesh network address of access router 2100-3, (d) the packet 2970 is forwarded to the access router 2100-3 using mesh network protocol with the mobile node 2000-7 relaying it, (e) the access router 2100-3 decapsulates the packet 2970 to extracts packet 2990, (f) the packet 2990 is routed through the global communications network 2300 to reach the home agent 2500-2, and (g) the home agent 2500-2 decapsulates the packet 2990 and sends the inner packet 2960 to the peer 2400-3.

Figure 19:
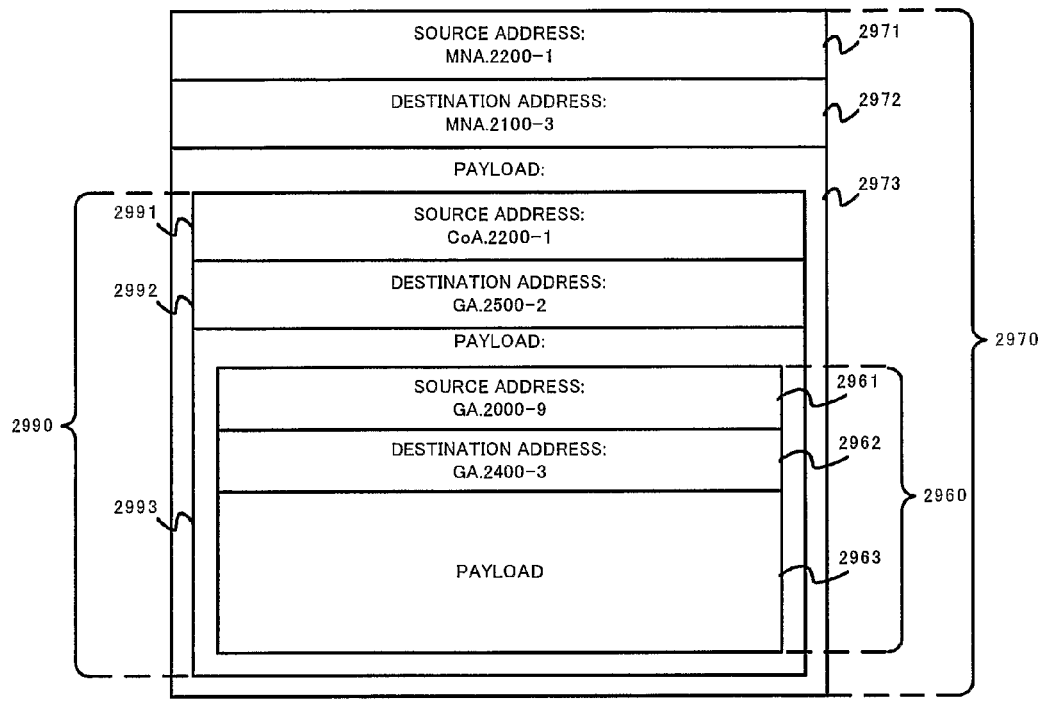
FIG. 19 is a diagram showing the first example of packet format used in the mesh mode in the system architecture of FIG. 18.

FIG. 19 shows the packet 2960 sent in the mesh mode. The original packet 2960 has the source address 2961 equal to GA.2000-9 (the global address of the mobile node 2000-9) and the destination address 2962 equal to GA.2400-3 (the global address of the peer 2400-3). This packet 2960 forms the payload 2993 of the next outer packet 2990, with the source address 2991 equal to CoA.2200-1 (the care-of-address of the mobile router 2200-1) and the destination address 2992 equal to GA.2500-2 (the global address of the home agent 2500-2). The packet 2990 is further encapsulated as the payload 2973 of the outermost packet 2970, with the source address 2971 equal to MNA.2200-1 (the mesh network address of the mobile router 2200-1) and the destination address 2972 equal to MNA.2100-3 (the mesh network address of the access router 2100-3).

A packet 2965 (shown in FIG. 15 described later) sent by the peer 2400-3 to the mobile node 2000-9 will follow the reverse path: (a) the packet is intercepted by the home agent 2500-2, (b) the home agent 2500-2 encapsulates the packet 2965 into a new packet 2995 to be tunneled to the mobile router 2200-1, (c) the packet 2995 is routed through the global communications network 2300 to reach the access router 2100-3, (d) the access router 2100-3 encapsulates the packet 2995 in a new packet 2975 to be addressed to the mesh network address of the mobile router 2200-1, (e) the mobile node 2000-7 will relay the packet 2975 in mesh network protocol, and (f) the mobile router 2200-1 decapsulates the packet 2975 twice and forwards the inner packet 2965 to the mobile node 2000-9.

Figure 20:
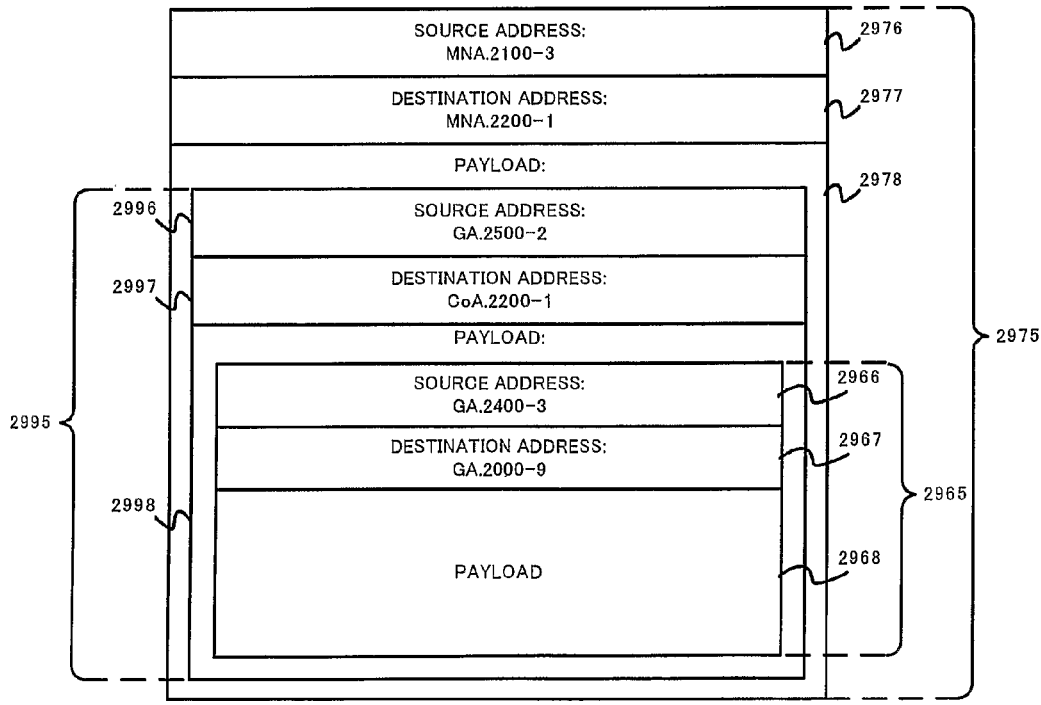
FIG. 20 is a diagram showing the second example of packet format used in the mesh mode in the system architecture of FIG. 18.

FIG. 20 also shows the packet 2965 sent in the mesh mode. The original packet 2965 has the source address 2966 equal to GA.2400-3 (the global address of the peer 2400-3) and the destination address 2967 equals to GA.2000-9 (the global address of the mobile node 2000-9). This packet 2965 forms the payload 2998 of the next outer packet 2995, with the source address 2996 equal to GA.2500-2 (the global address of the home agent 2500-2) and the destination address 2997 equal to CoA.2200-1 (the care-of-address of the mobile router 2200-1). The packet 2995 is further encapsulated as the payload 2978 of the outermost packet 2975, with the source address 2976 equal to MNA.2100-3 (the mesh network address of the access router 2100-3) and the destination address 2977 equal to MNA.2200-1 (the mesh network address of the mobile router 2200-1).

In FIG. 18, it is also possible for the disclosed invention to be used in the ingress network of the mobile router 2200-1. When the mobile node 2000-10 wanders too far away from the mobile router 2200-1, it will lose link layer connectivity with the mobile router 2200-1 (this situation is illustrated in FIG. 18). When this happens, the mobile node 2000-10 can enter the mesh mode, and packets forwarded between the mobile node 2000-10 and the mobile router 2200-1 will be encapsulated with relevant mesh network addresses and relayed through the mobile node 2000-9 using mesh network protocol.

Thus, according to a system and associated apparatuses and methods disclosed within the second embodiment of this invention, a node in the mobile communicating system can more effectively communicate with one another by switching between the hierarchical and mesh modes as and when necessary.

Third Embodiment

In the third embodiment of this invention, a special extension of the system, apparatuses and methods in the first and second embodiments are disclosed. In the third embodiment, like the second embodiment, the mobile nodes and access routers will encapsulate packets to be forwarded to each other when operating in the mesh mode. However, in the second embodiment, the reason for this extra tunneling is to suit the use of different address spaces. For the third embodiment, the reason is for security reasons: in the mesh mode, other mobile nodes relay packets. Thus, it is vulnerable to spoofing and other related attacks. Hence, it is desirable to encrypt or at least protect the integrity of packets when communicating in the mesh mode. The easiest way to do so is to encapsulate the packet into an encrypted or security protected tunnel between the mobile node and its access router. Although in the second embodiment and the third embodiment, packets are encapsulated in the mesh mode for different reasons, it should be obvious to anyone skilled in the art that it is possible to combine the two into one: encapsulation for security protection and to change the source and destination addresses to their mesh network addresses equivalent. Here, the description will concentrate on security protection, but the reader should bear in mind the possibility of such a combination. Further, the descriptions of the third embodiment will assume that the node will use a mesh network address when operating in the mesh mode. It should be apparent to anyone skilled in the art that for a deployment scenario requires only security encapsulations without a need to change the address space, the description disclosed in this third embodiment can be employed as is by treating the mesh network address of each node to be equal to the address used in the hierarchical mode.

Figure 21:
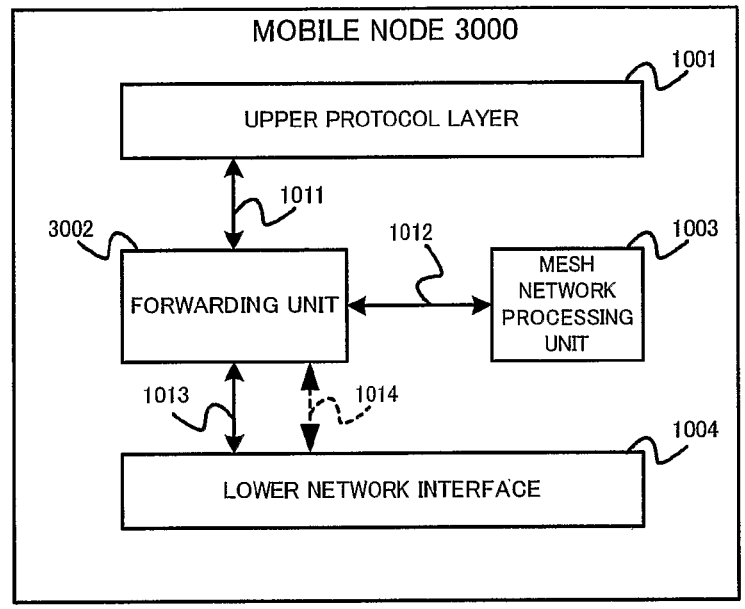
FIG. 21 is a diagram showing architecture of a mobile node in the third embodiment of the present invention.
Figure 22:
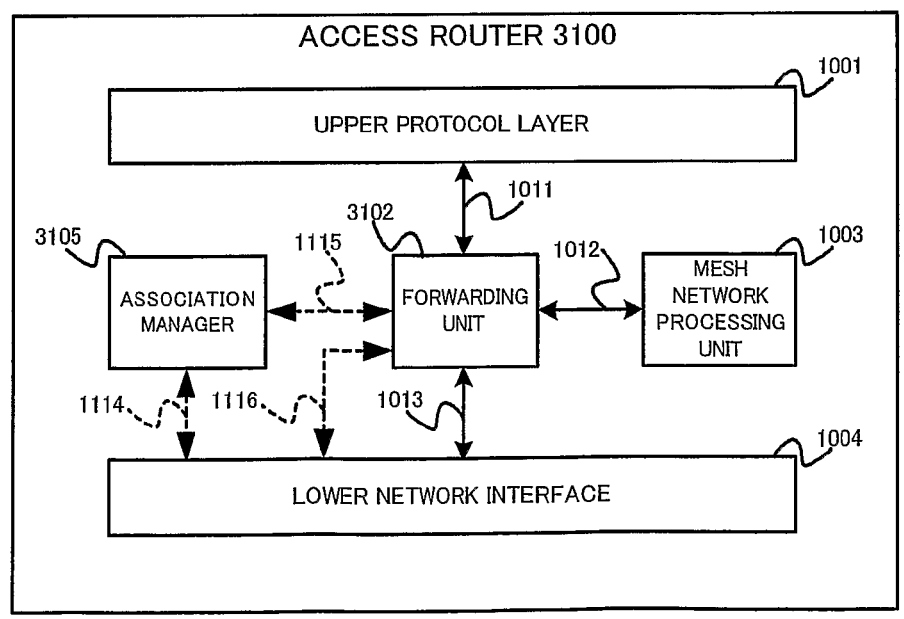
FIG. 22 is a diagram showing architecture of an access router in the third embodiment of the present invention.
Figure 23:
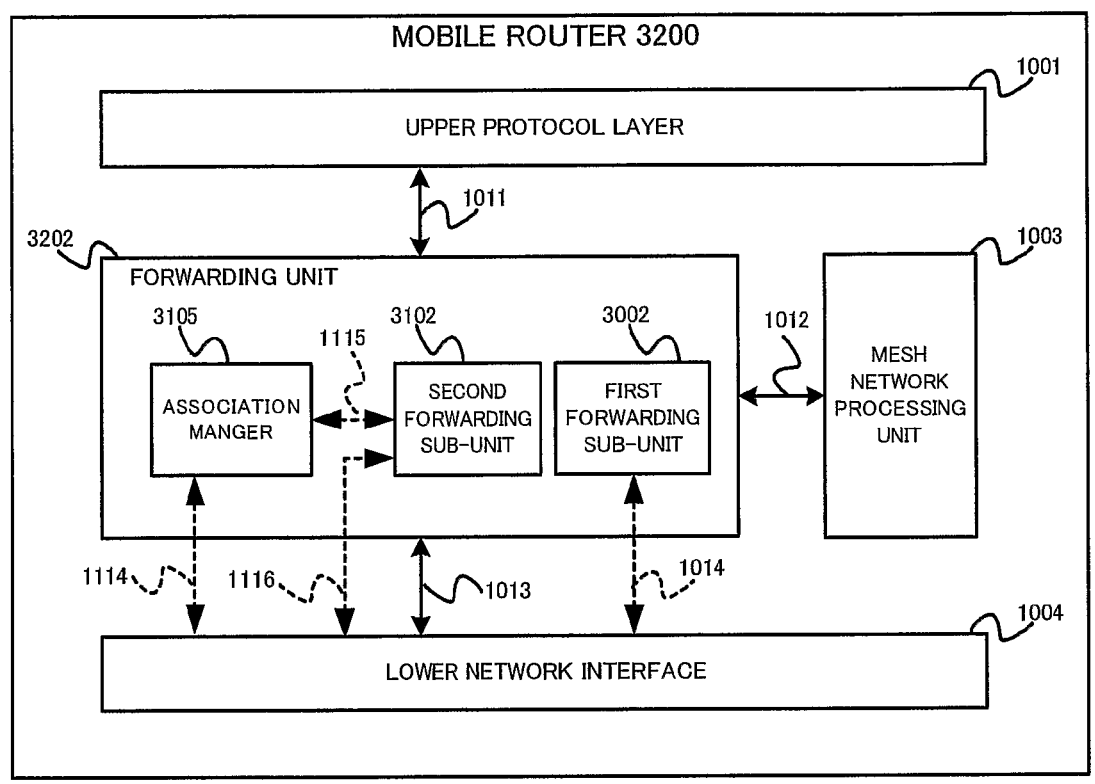
FIG. 23 is a diagram showing architecture of a mobile router in the third embodiment of the present invention.

In the third embodiment of this invention, a mobile node 3000, an access router 3100 and a mobile router 3200 deployed in a general wireless mobile network attached to a global packet-switched data communications network are disclosed. FIGS. 21 to 23 show the architectures of the mobile node 3000, the access router 3100 and the mobile router 3200, respectively. Within these architectures, functional blocks providing identical functionalities are given identical reference numerals. In addition, some functional blocks have identical functionalities as those described in the first and second embodiments. These are given the same reference numerals, and descriptions thereof are omitted.

Architecture of the mobile node 3000 comprises an Upper Layer Protocol 1001, a Forwarding Unit 3002, a Mesh Network Processing Unit 1003 and a single or plurality of Lower Network Interface 1004. Architecture of the access router 3100 comprises an Upper Layer Protocol 1001, a Forwarding Unit 3102, a Mesh Network Processing Unit 1003, a single or plurality of Lower Network Interface 1004 and an Association Manager 3105. Architecture of the mobile router 3200 is a hybrid of the mobile node 3000 and the access router 3100, comprising an Upper Layer Protocol 1001, a Forwarding Unit 3202, a Mesh Network Processing Unit 1003 and a single or plurality of Lower Network Interface 1004. Most of these are identical to those described in the first and second embodiments. Only difference lies in the Forwarding Units. In fact, the Forwarding Units are largely similar except for the need to cater for the use of security associations to protect the tunnel packets. To reduce duplication, the description in the third embodiment will only focus on these differences.

To protect tunneled packets, the mobile nodes need to exchange security associations with their access routers. These security associations are usually implemented using public key infrastructure. In this case, each node needs to generate a public and private keys pair, and let other nodes know of its public key. Other nodes can encrypt a packet using the public key that can only be decrypted with the private key. It can also sign a packet with its private key that can be verified by the public key. To let other nodes learn of their public key, there are many mechanisms available for nodes to use. For instance, when access routers broadcast router advertisements, they can attach special options to the advertisements that indicate their public keys. Hence when a mobile node receives the router advertisement, they can learn the public key of the access router. When the mobile node attaches to the access router, the mobile node can also let the access router know its own public key. Alternatively, the public key can also be queried by sending a special packet to the global address of a node, and the node will reply with its public key.

Figure 24:
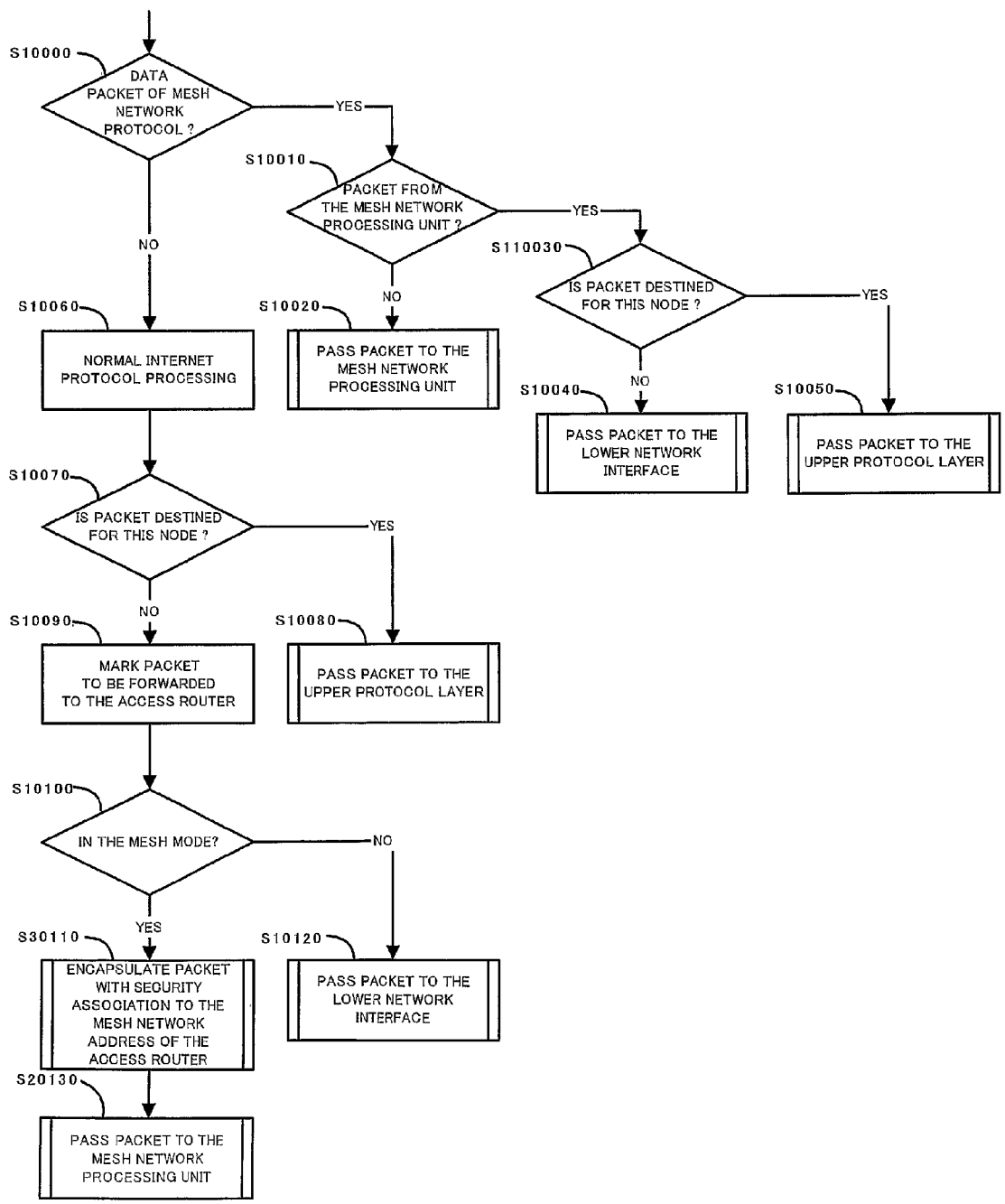
FIG. 24 is a flowchart showing processing which a Forwarding Unit of a mobile node performs in the third embodiment of the present invention.

FIG. 24 shows the flowchart for the processing of a data packet carried out by the Forwarding Unit 3002. Most of the steps are similar to those as described in the disclosure of the Forwarding Unit 2002 of the second embodiment. Those steps that are identical are given the same reference numeral and descriptions of these steps are henceforth omitted. The difference is when the Forwarding Unit 3002 checked if it is in the hierarchical or mesh mode in step S10100, and found that it is in the mesh mode (Yes in step S10100). The Forwarding Unit 3002 then proceeds to step S30110 where the packet is encapsulated in a new packet that is protected by the security association of the access router of the mobile node 3000, and addressed to the mesh network address of the access router. The new packet is then passed to the Mesh Network Processing Unit 1003 in step S20130.

The Association Manager 3105 of the access router 3100 manages the association of the mobile nodes, and is largely similar to the Association Manager 1105 as described in the first embodiment. The difference is that in addition to storing the unique identifier and the communication mode (mesh or hierarchical) of associated mobile nodes, it also needs to store the security association of the associated mobile nodes.

Hence, if the implementation of the Association Manager 3105 is to use a relational structure of memory locations to form a table of associations, each row in the table will at least contain (a) unique identifier of the mobile node, possibly the IP address, (b) communication mode (mesh or hierarchical), (c) the security association of the mobile node and (d) the mesh network address of the mobile node, if the mesh network address is different from the global address.

Figure 25:
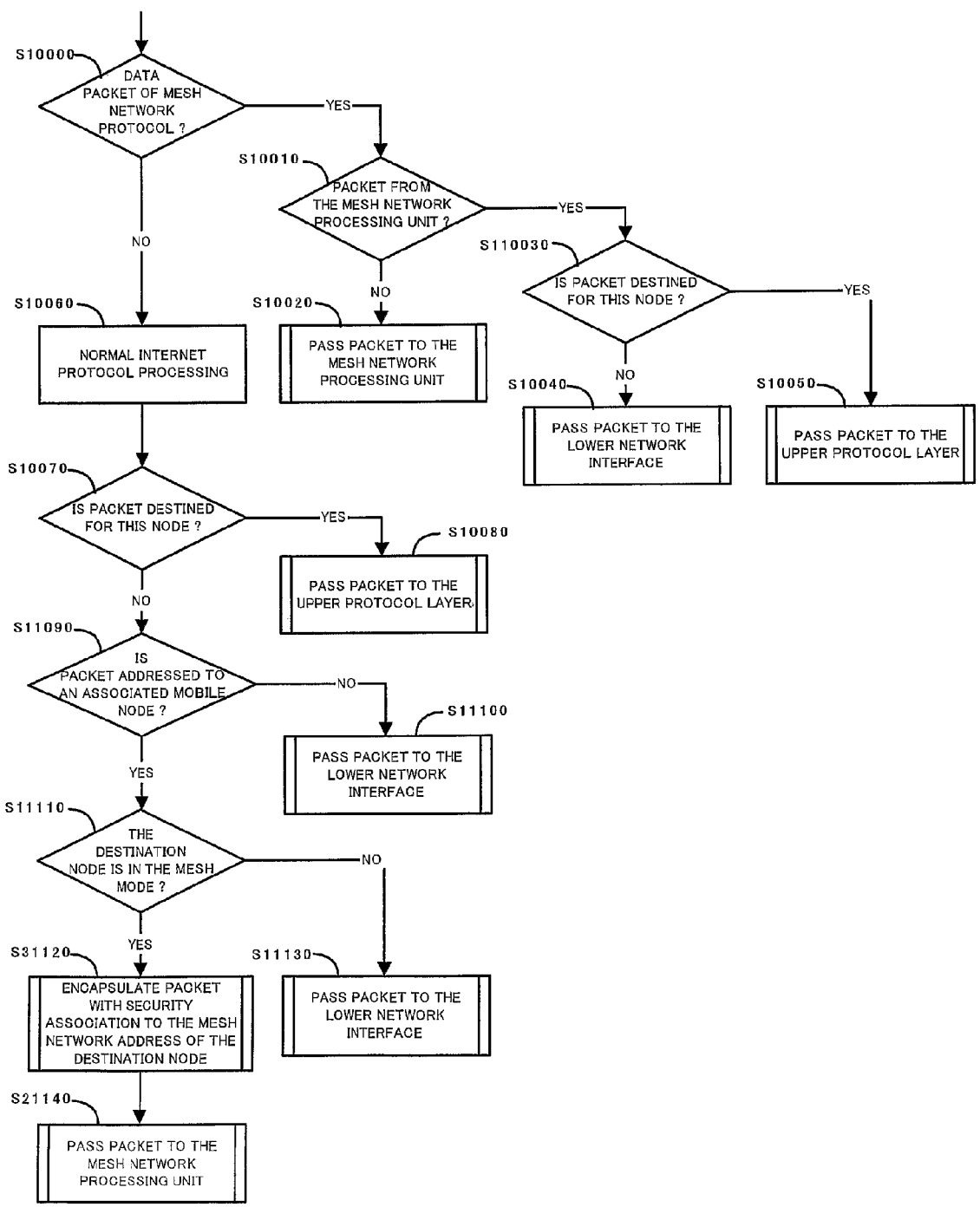
FIG. 25 is a flowchart showing processing which a Forwarding Unit of an access router performs in the third embodiment of the present invention.

The Forwarding Unit 3102 of the access router 3100 is also largely similar to the Forwarding Unit 2102 as described in the second embodiment. FIG. 25 shows the difference in its processing of packets. Most of the steps are similar to those as described in the disclosure of the Forwarding Unit 2102 of the second embodiment. Those steps that are identical are given the same reference numeral and descriptions of these steps are henceforth omitted. The difference is when the Forwarding Unit 3102 checked if the destination of a packet is in the hierarchical or mesh mode in step S11110, and found that it is in the mesh mode (Yes in step S11110). The Forwarding Unit 3102 then proceeds to step S31120 where the packet is encapsulated in a new packet that is protected with the security association of the destination mobile node, and addressed to the mesh network address of the mobile node. The new packet is then passed to the Mesh Network Processing Unit 1003 in step S21140.

The Forwarding Unit 3202 of the mobile router 3200 is essentially a sum of the Forwarding Unit 3002 of the mobile node 3000 and the Forwarding Unit 3102 of the access router 3100. The Forwarding Unit 3202 consists of the Egress Forwarding Unit 3002, which handles outgoing packets that need to be forwarded to the access router of the mobile router 3200. This is basically identical in functionality with the Forwarding Unit 3002 of the mobile node 3000, and thus is given the same reference numeral. There is also the Ingress Forwarding Unit 3102 and Association Manager 3105, which handle packets that need to be forwarded to mobile nodes that are attached to the mobile router 3200. These have functionalities that are identical to the Forwarding Unit 3102 and Association Manager 3105 of the access router 3100, and thus are given the same reference numerals. Detail descriptions of these sub-components are also omitted to reduce duplication.

The Forwarding Unit 3202 of the mobile router 3200 is essentially a sum of the packet forwarding functionality of the Forwarding Unit 3002 of the mobile node 3000 and the packet forwarding functionality to the ingress network of the Forwarding Unit 3102 of the access router 3100. The Forwarding Unit 3202 consists of the First Forwarding Sub-Unit 3002, which handles outgoing packets that need to be forwarded to the access router of the mobile router 3200. This First Forwarding Sub-Unit 3002 is basically identical in functionality with the Forwarding Unit 3002 of the mobile node 3000, and thus is given the same reference numeral. There is also the Second Forwarding Sub-Unit 3102 and the Association Manager 3105, which handle packets that need to be forwarded to mobile nodes that are attached to the mobile router 3200. These have functionalities that are identical to the Forwarding Unit 3102 and the Association Manager 3105 of the access router 3100, and thus are given the same reference numerals. Furthermore, the Forwarding Unit 3202 consists of the functionality of normal Internet Protocol processing as the First and Second Forwarding Sub-Units 3002 and 3102. In FIG. 23, the First and Second Forwarding Sub-Units 3002 and 3102 are illustrated as separate components, they can be implemented in the same hardware with the same function and processing united. Also, the First and Second Forwarding Sub-Units 3002 and 3102 can cooperate with each other, and exchange packets with each other. Detail descriptions of these sub-components are also omitted to reduce duplication.

The Forwarding Unit 3202 of the mobile router 3200 can be considered as a combination of the Forwarding Unit (First Forwarding Sub-Unit) 3002 of the mobile node 3000 and the Forwarding Unit (Second Forwarding Sub-Unit) 3102 of the access router 3100. When the mobile router 3200 performs packet processing, the Forwarding Unit 3202 checks if the destination address of the packet is located within its ingress network (that is, whether the destination is a mobile node which is attached to the mobile router 3200 or not). When the destination address of the packet is located within its ingress network, the packet will be passed to the Second Forwarding Sub-Unit 3102 for further processing. The processing logic of the Second Forwarding Sub-Unit 3102 will follow that described in FIG. 25. When the destination address of the packet is not located within its ingress network, the packet will need to be sent to the access router of the mobile router 3200, and then the packet is passed to the First Forwarding Sub-Unit 3002 for further processing. The processing logic of the First Forwarding Sub-Unit 3002 will follow that described in FIG. 24.

The functionality of the above Forwarding Unit 3202 of the mobile router 3200 can be put into the following. The Forwarding Unit 3202 of the mobile router 3200 basically performs the same packet processing as flowchart shown in FIG. 25. The access router 3100 can always use the hierarchical protocol against a packet sent from the egress interface, however, the mobile router 3200 needs to appropriately choose the use of the hierarchical protocol or the mesh protocol even against a packet sent from the egress interface. In other words, the mobile router 3200 needs to convert the packet of the hierarchical protocol to be sent to the access router 3100 into the packet of the mesh network protocol when the mobile router 3200 has no link layer connection with the access router 3100. In this case, the mobile router 3200 needs to determine whether the egress interface of the mobile router 3200 is in the hierarchical or mesh mode by performing the same processing as step S10100 in FIG. 24.

Figure 26:
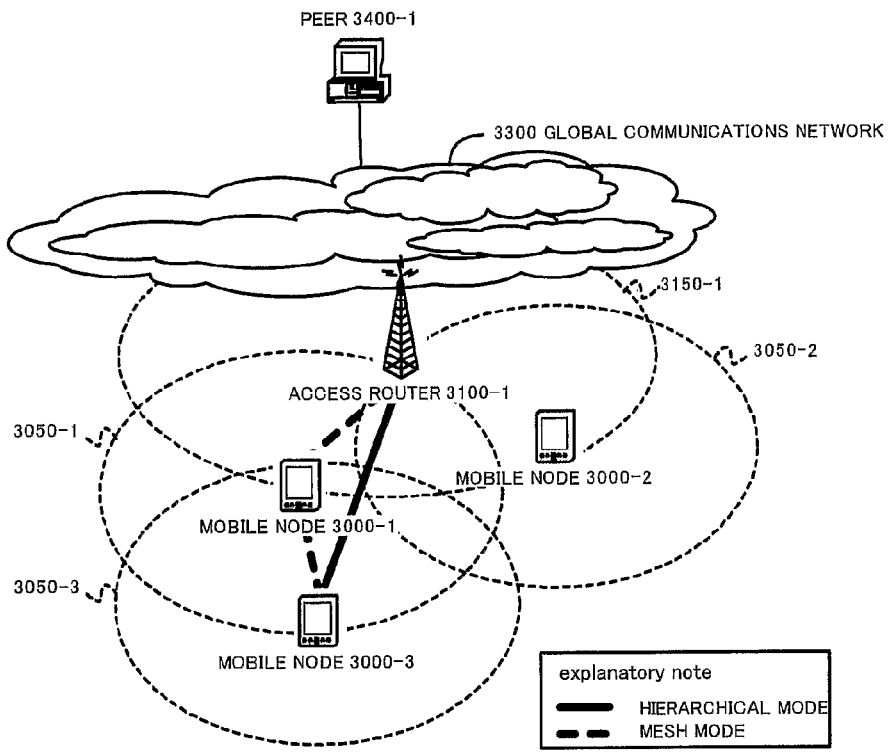
FIG. 26 is a diagram showing the first example of system architecture in the third embodiment of the present invention.
Figure 27:
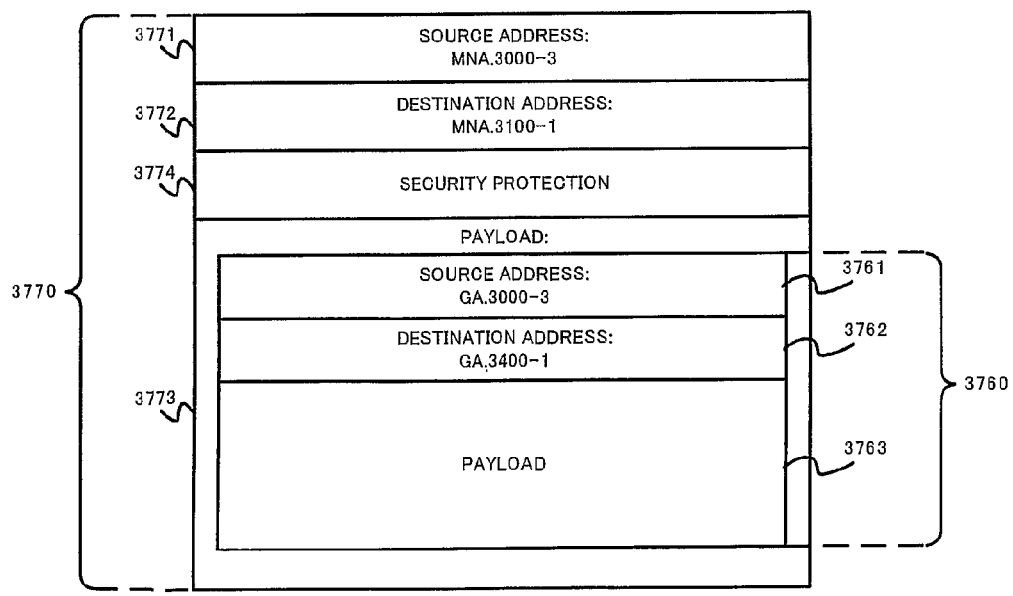
FIG. 27 is a diagram showing an example of packet format used in the mesh mode in the system architecture of FIG. 26.

FIG. 26 shows a simple deployment scenario. The mobile nodes 3000-1, 3000-2 and 3000-3 are all attached to the access router 3100-1. The dotted ellipses 3050-1, 3050-2, 3050-3 and 3150-1 show the wireless operating range of the mobile nodes 3000-1, 3000-2, 3000-3 and the access router 3100-1 respectively. The mobile node 3000-3 is having an active session with wired node peer 3400-1 when it moves out of the operating range of the access router 3100-1 (this situation is illustrated in FIG. 26). Under normal wireless deployment, the session between the mobile node 3000-3 and the peer 3400-1 cannot be maintained. However, with the apparatus disclosed in this invention deployed, the mobile node 3000-3 will detect that its link layer connection with the access router 3100-1 is broken. In this case, the mobile node 3000-3 will enter the mesh mode, and send a message to the mesh network address of the access router 3100-1 informing the access router 3100-1 that it has entered the mesh mode. Note that this message can be protected with the security association of the access router 3100-1 as well. Thereafter, packets sent by the mobile node 3000-3 to the peer 3400-1 will be encapsulated with security association of the access router 3100-1 in a new packet forwarded to the access router 3100-1 via the mobile node 3000-1. FIG. 27 shows the packet sent in the mesh mode. The original packet 3760 has the source address 3761 equal to GA.3000-3 (the global address of the mobile node 3000-3) and the destination address 3762 equal to GA.3400-1 (the global address of the peer 3400-1). This packet 3760 forms the payload 3773 of the outer packet

3770, with a security protection 3774, and the source address 3771 equal to MNA.3000-3 (the mesh network address of the mobile node 3000-3) and the destination address 3772 equal to MNA.3100-1 (the mesh network address of the access router 3100-1). Note that if the mesh mode does not require a different address space, then MNA.3000-3 and MNA.3100-1 are the global addresses of the mobile node 3000-3 and the access router 3100-1 respectively.

From the access router 3100-1, the packet 3760 is decapsulated from the packet 3770 and routed through the global communications network 3300 to the peer 3400-1. Similarly, a packet sent from the peer 3400-1 to the mobile node 3000-3 is routed to the access router 3100-1. From there, the access router 3100-1 checks that the mobile node 3000-3 is in the mesh mode, and thus encapsulates the packet with security association of the mobile node 3000-3 to be forwarded to the mobile node 3000-3 via the mobile node 3000-1.

Figure 28:
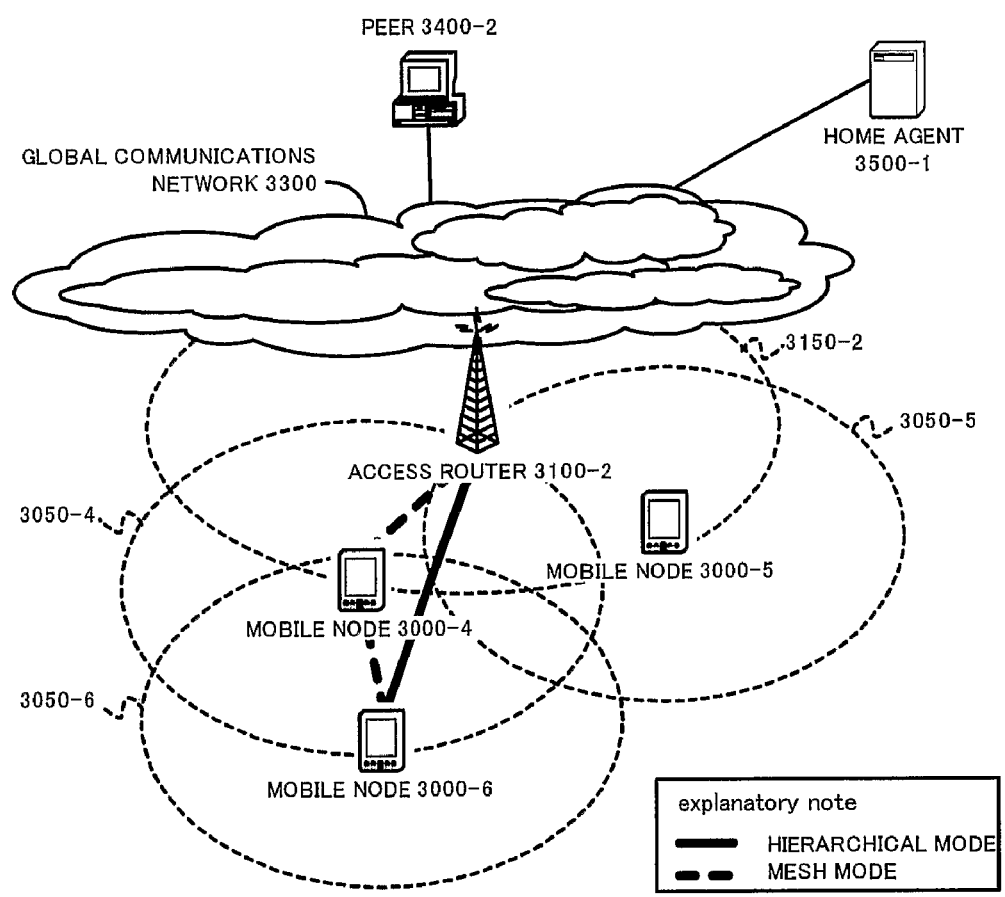
FIG. 28 is a diagram showing the second example of system architecture in the third embodiment of the present invention.
Figure 29:
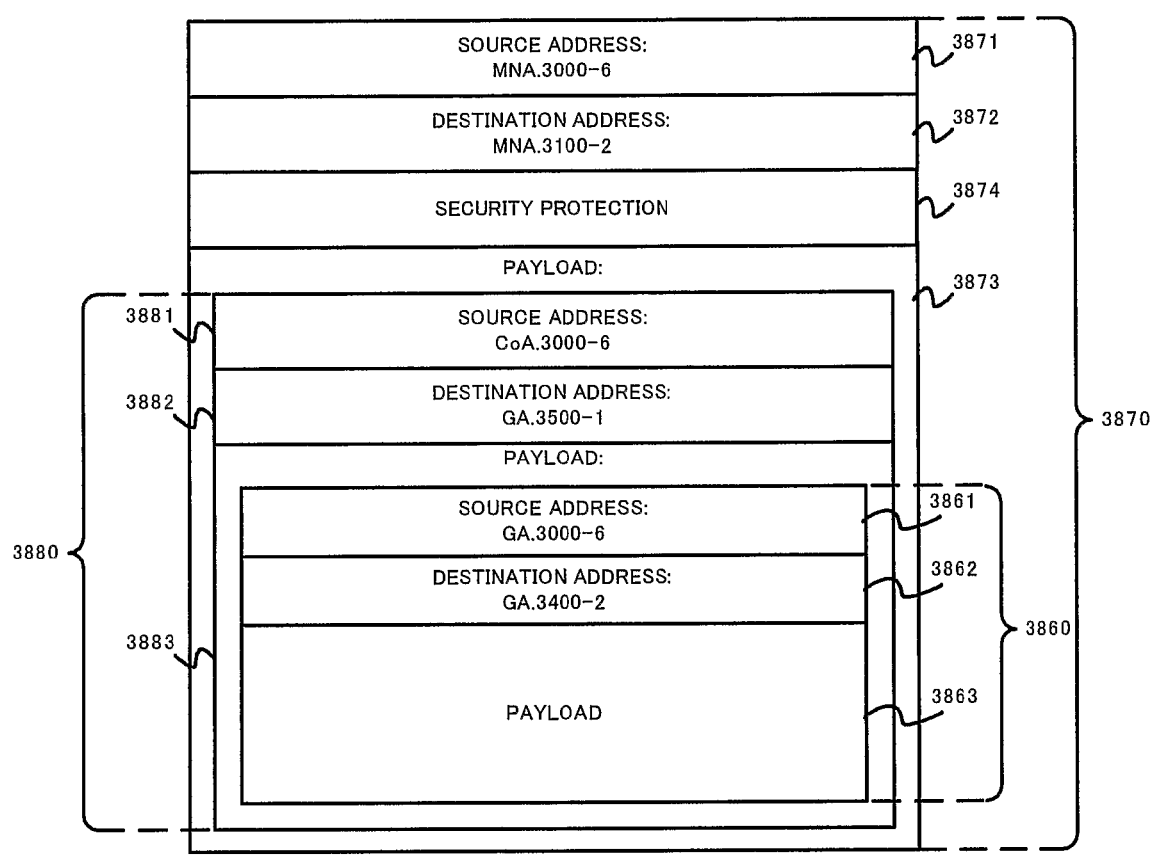
FIG. 29 is a diagram showing an example of packet format used in the mesh mode in the system architecture of FIG. 28.

One can extend the deployment scenario to a system when mobile nodes employ Mobile IP to communicate with nodes on the global communication network 3300. This is illustrated in FIG. 28. Here, the mobile nodes 3000-4, 3000-5 and 3000-6 are all attached to the access router 3100-2. The dotted ellipses 3050-4, 3050-5, 3050-6 and 3150-2 show the wireless operating range of the mobile nodes 3000-4, 3000-5, 3000-6 and the access router 3100-2 respectively. The home agent 3500-1 is acting as the home agent for the mobile node 3000-6. The mobile node 3000-6 gets a care-of-address from the access router 3100-2 when it attached to the access router 3100-2. When the mobile node 3000-6 is within operating range of the access router 3100-2, it will encapsulate a packet sent to the peer 3400-2 to the home agent 3500-1. Similarly, when the peer 3400-2 sends a packet to the mobile node 3000-6, the packet will be routed to the home agent 3500-1. The home agent 3500-1 then encapsulates this packet, and forwards it to the care-of-address of the mobile node 3000-6. When the mobile node 3000-6 moves out of the operating range of the access router 3100-2, the mobile node 3000-6 will detect that its link layer connection with the access router 3100-2 is broken (this situation is illustrated in FIG. 28). In this case, the mobile node 3000-6 will enter the mesh mode, and send a message to the access router 3100-2 informing that it has entered the mesh mode. Note that this message can be protected with the security association of the access router 3100-2 as well. Thereafter, packets sent from the mobile node 3000-6 to the peer 3400-2 will be first encapsulated to the home agent 3500-1, and the entire packet is further encapsulated in another packet protected with security association of the access router 3100-2 and forwarded to the access router 3100-2. FIG. 29 shows the packet sent in the mesh mode. The original packet 3860 has the source address 3861 equal to GA.3000-6 (the global address of the mobile node 3000-6) and the destination address 3862 equal to GA.3400-2 (the global address of the peer 3400-2). This packet 3860 forms the payload 3883 of the next outer packet 3880, with the source address 3881 equal to CoA.3000-6 (the care-of-address of the mobile node 3000-6) and the destination address 3882 equal to GA.3500-1 (the global address of the home agent 3500-1). The packet 3880 is further encapsulated as the payload 3873 of the outermost packet 3870, with a security protection 3874 and the source address 3871 equal to MNA.3000-6 (the mesh network address of the mobile node 3000-6) and the destination address 3872 equals to MNA.3100-2 (the mesh network address of the access router 3100-2).

The entire packet 3870 is forwarded to the access router 3100-2 using mesh network protocol via the mobile node 3000-4. From the access router 3100-2, the packet 3880 is decapsulated from the packet 3870 and routed to the home agent 3500-1, where the packet 3860 is decapsulated from packet 3880 and the inner packet 3860 is forwarded to the peer 3400-2. Similarly, when the peer 3400-2 sends the mobile node 3000-6 a packet, the packet will be intercepted by the home agent 3500-1 and encapsulated to the mobile node 3000-6. This packet will reach the access router 3100-2, where it is discovered that the mobile node 3000-6 is in the mesh mode. The packet is thus encapsulated in a packet protected with security association of the mobile node 3000-6 and forwarded to the mobile node 3000-6 using mesh network protocol (via the mobile node 3000-4).

Figure 30:
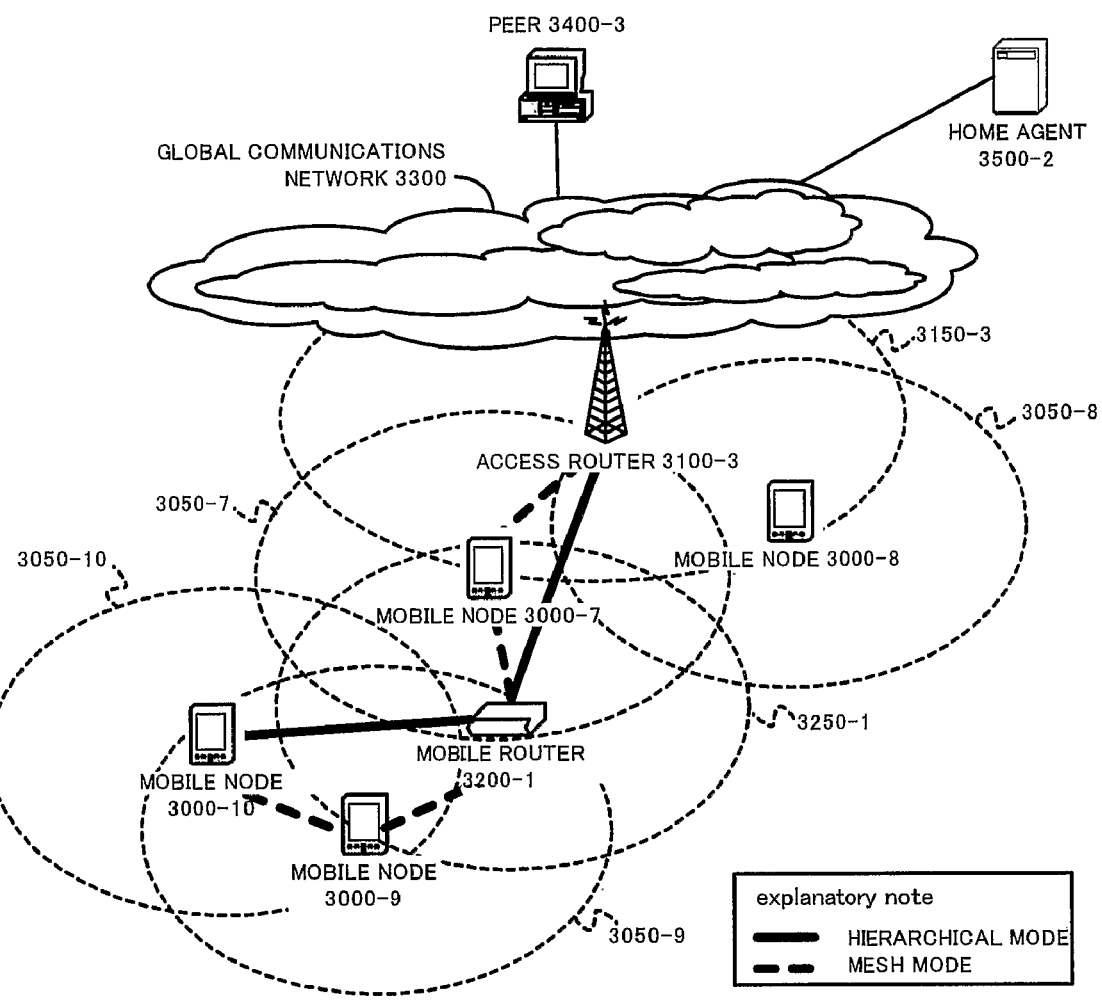
FIG. 30 is a diagram showing the third example of system architecture in the third embodiment of the present invention.

This Mobile IP scenario can be further extended to include Network Mobility, as shown in FIG. 30. Here the mobile nodes 3000-7, 3000-8 and the mobile router 3200-1 are attached to the access router 3100-3. Mobile nodes 3000-9 and 3000-10 are attached to the mobile router 3200-1. The home agent 3500-2 is the home agent of the mobile router 3200-1. The dotted ellipses 3050-7, 3050-8, 3050-9, 3050-10, 3150-3 and 3250-1 show the wireless operating range of the mobile nodes 3000-7, 3000-8, 3000-9, 3000-10, the access router 3100-3 and the mobile router 3200-1 respectively. The mobile node 3000-9 is communicating with the peer 3400-3. When the mobile router 3200-1 is within operating range of the access router 3100-3, a packet sent by the mobile node 3000-9 to the peer 3400-3 will go through the following path: (a) the packet is forwarded to the mobile router 3200-1, (b) the mobile router 3200-1 encapsulates the packet to be tunneled to the home agent 3500-2, (c) the entire packet is forwarded to the access router 3100-3, (d) the packet is routed through the global communications network 3300 to reach the home agent 3500-2, and (e) the home agent 3500-2 decapsulates the packet and sends the inner packet to the peer 3400-3. A packet sent by the peer 3400-3 will follow the reverse path: (a) the packet is intercepted by the home agent 3500-2, (b) the home agent 3500-2 encapsulates the packet to be tunneled to the mobile router 3200-1, (c) the entire packet is routed through the global communications network 3300 to reach the access router 3100-3, (d) the access router 3100-3 forwards the packet to the mobile router 3200-1, and (e) the mobile router 3200-1 decapsulates the packet and forwards the inner packet to the mobile node 3000-9. This sequence is as per specified by the network mobility support of Mobile IP.

When the mobile router 3200-1 moves out of the operating range of the access router 3100-3, the mobile router 3200-1 will detect that its link layer connection with the access router 3100-3 is broken (this situation is illustrated in FIG. 30). In this case, the mobile router 3200-1 will enter the mesh mode, and send a message to the access router 3100-3 informing that it has entered the mesh mode. The message is sent using mesh network protocol, and addressed to the mesh network address of the access router 3100-3. Note that this message can be protected with the security association of the access router 3100-3 as well. Thereafter, the packet 3960 (shown in FIG. 31 described later) sent from the mobile node 3000-9 to the peer 3400-3 will follow the following path: (a) the packet 3960 is forwarded to the mobile router 3200-1, (b) the mobile router 3200-1 encapsulates the packet 3960 into a new packet 3990 to be tunneled to the home agent 3500-2, (c) the entire packet 3990 is further encapsulated in the packet 3970 protected with security association of the access router 3100-3, and if different address spaces are used, the packet 3970 will have the mesh network addresses of the mobile router 3200-1 and the access router 3100-3 as well, (d) the packet 3970 is forwarded to the access router 3100-3 using mesh network protocol with the mobile node 3000-7 relaying it, (e) the access router 3100-3 decapsulates the packet 3970 to extract the packet 3990, (f) the packet 3990 is routed through the global communications network 3300 to reach the home agent 3500-2, and (g) the home agent 3500-2 decapsulates the packet 3990 and sends the inner packet 3960 to the peer 3400-3.

Figure 31:
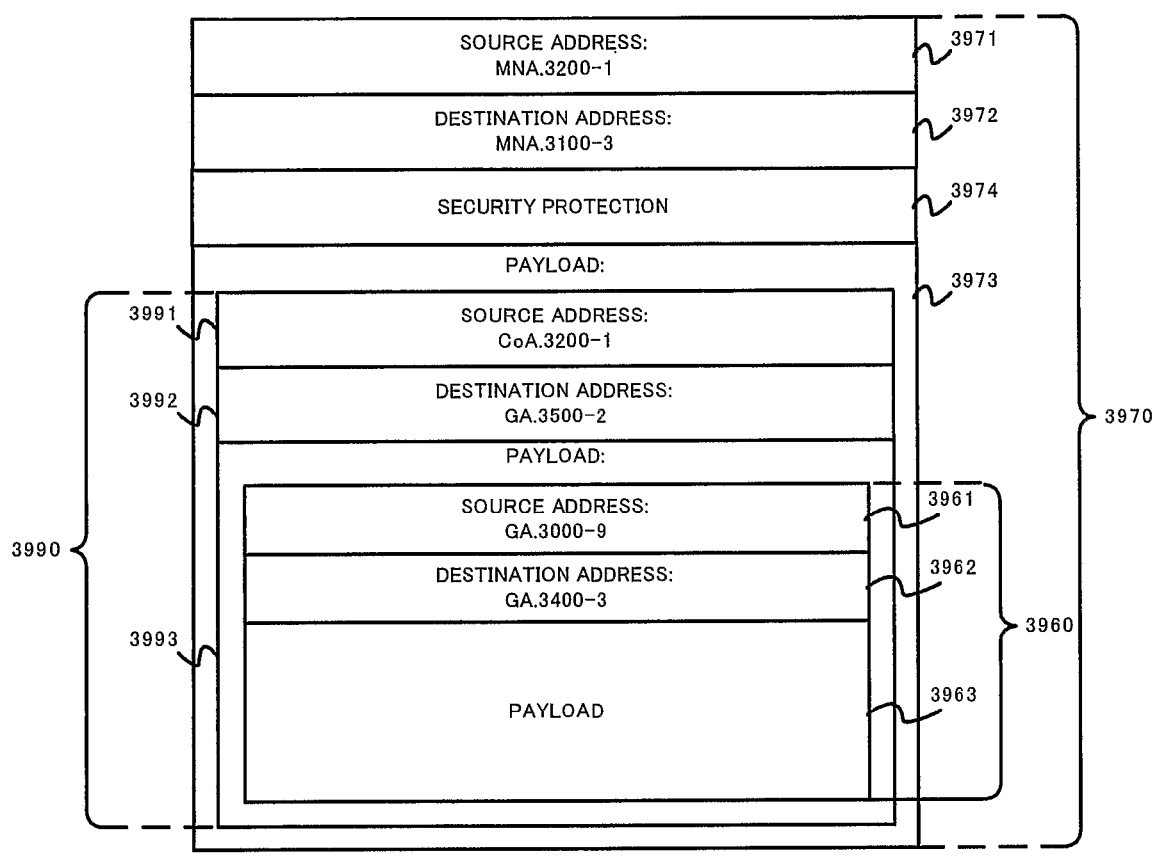
FIG. 31 is a diagram showing the first example of packet format used in the mesh mode in the system architecture of FIG. 30.

FIG. 31 shows the packet 3960 sent in the mesh mode. The original packet 3960 has the source address 3961 equal to GA.3000-9 (the global address of the mobile node 3000-9) and the destination address 3962 equal to GA.3400-3 (the global address of the peer 3400-3). This packet 3960 forms the payload 3993 of the next outer packet 3990, with the source address 3991 equal to CoA.3200-1 (the care-of-address of the mobile router 3200-1) and the destination address 3992 equal to GA.3500-2 (the global address of the home agent 3500-2). The packet 3990 is further encapsulated as the payload 3973 of the outermost packet 3970, protected with the Security Protection 3974. In addition, the source address 3971 equals to MNA.3200-1 (the mesh network address of the mobile router 3200-1) and the destination address 3972 equals to MNA.3100-3 (the mesh network address of the access router 3100-3). Note that if there is no need to use different address spaces, then MNA.3200-1 and MNA.3100-3 are simply identical to CoA.3200-1 and GA.3100-3 (the global address of the access router 3100-3) respectively.

A packet 3965 (shown in FIG. 32 described later) sent by the peer 3400-3 to the mobile node 3000-9 will follow the reverse path: (a) the packet is intercepted by the home agent 3500-2, (b) the home agent 3500-2 encapsulates the packet 3965 into a new packet 3995 to be tunneled to the mobile router 3200-1, (c) the packet 3995 is routed through the global communications network 3300 to reach the access router 3100-3, (d) the access router 3100-3 encapsulates the packet 3995 in a new packet 3975 to be protected with security association of the mobile router 3200-1, (e) the mobile node 3000-7 will relay the packet 3975 in mesh network protocol, and (f) the mobile router 3200-1 decapsulates the packet 3975 twice and forwards the inner packet 3965 to the mobile node 3000-9.

Figure 32:
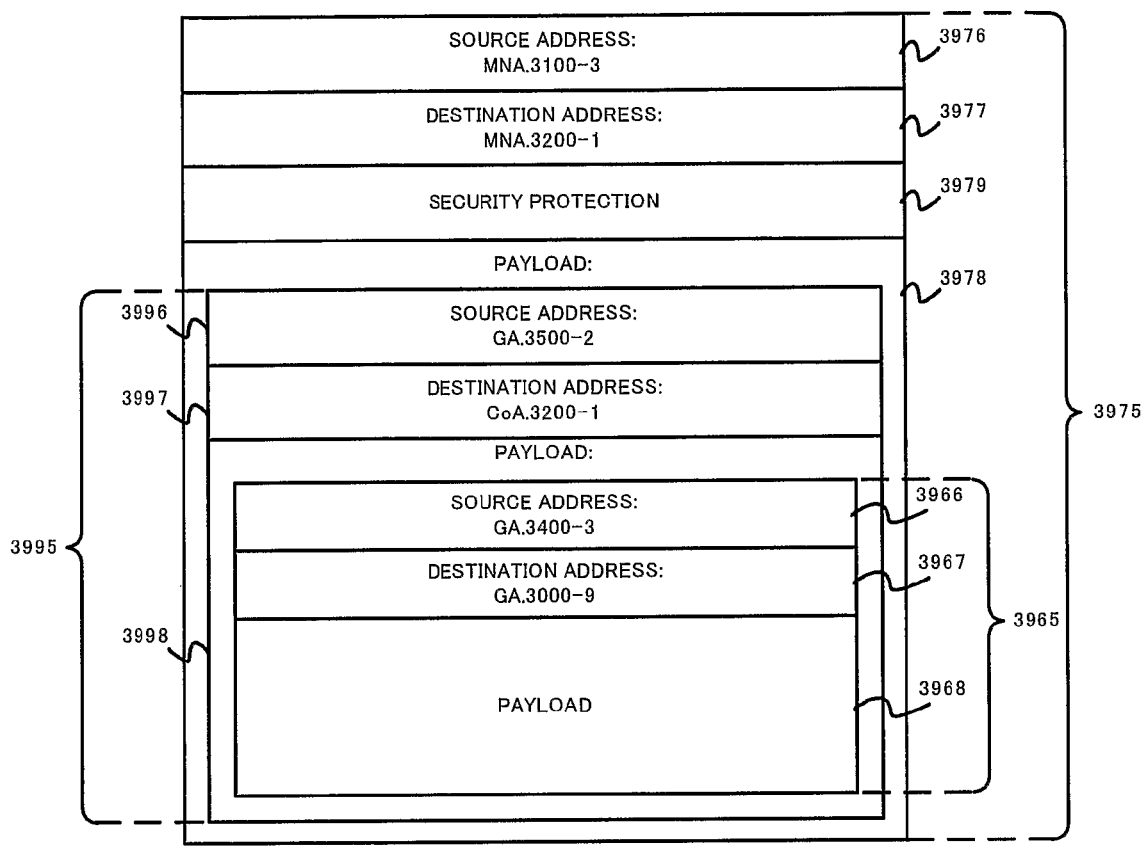
FIG. 32 is a diagram showing the second example of packet format used in the mesh mode in the system architecture of FIG. 30.

FIG. 32 also shows the packet 3965 sent in the mesh mode. The original packet 3965 has the source address 3966 equal to GA.3400-3 (the global address of the peer 3400-3) and the destination address 3967 equal to GA.3000-9 (the global address of the mobile node 3000-9). This packet 3965 forms the payload 3998 of the next outer packet 3995, with the source address 3996 equal to GA.3500-2 (the global address of the home agent 3500-2) and the destination address 3997 equal to CoA.3200-1 (the care-of-address of the mobile router 3200-1). The packet 3995 is further encapsulated as the payload 3978 of the outermost packet 3975, protected with the Security Protection 3979. In addition, the source address 3976 equals to MNA.3100-3 (the mesh network address of the access router 3100-3) and the destination address 3977 equals to MNA.3200-1 (the mesh network address of the mobile router 3200-1). Note that if there is no need to use different address spaces, then MNA.3200-1 and MNA.3100-3 are simply identical to CoA.3200-1 and GA.3100-3 (the global address of the access router 3100-3) respectively.

In FIG. 30, it is also possible for the disclosed invention to be used in the ingress network of the mobile router 3200-1. When the mobile node 3000-10 wanders too far away from the mobile router 3200-1, it will lose link layer connectivity with the mobile router 3200-1 (this situation is illustrated in FIG. 30). When this happens, the mobile node 3000-10 can enter the mesh mode, and packets forwarded between the mobile node 3000-10 and the mobile router 3200-1 will be encapsulated with relevant security associations and relayed through the mobile node 3000-9 using mesh network protocol.

Thus, according a system and associated apparatuses and methods disclosed within the third embodiment of this invention, a node in the mobile communicating system can more effectively communicate with one another by switching between the hierarchical and mesh modes as and when necessary.

The above embodiments assume that the mobile nodes will usually operate in the hierarchical mode, and switch to the mesh networking mode only when they fail to reach the access routers. In terms of transport efficiency, this hybrid operation is the most optimal. However, implementation of mobile node may be constrained by other perspective, such as complexity of the mobile node. Thus, it may be possible for a mobile node to be implemented such that it always uses the mesh networking mode only, regardless of whether the access router can be reached or not. This may result in a simpler implementation of the mobile nodes. It should be obvious to a person skilled in the art that such a mobile node would still be within the scope and ambit of the preferred embodiments as disclosed in the present specification.

Although it is assumed that an example of the protocol used in the hierarchical mode is mobile IPv6 or NEMO and an example of the protocol used in the mesh mode is MANET protocol in the above embodiments, the present invention is not restricted to the above protocols. The other protocols which allow the similar operations as those that are implemented by the above protocols can be applied to the present invention. Also, although the cases are described in the above embodiments that the present invention is mainly applied to the operations in the Layer 3, the present invention can be applied to the other Layers such as the Layer 2.

Industrial Applicability

According to the present invention, connection can be always maintained and disruption of on-going transport session can be prevented by making effective use of two architectures (hierarchical and mesh architectures). The present invention can be applied to the technical field of the network including a mobile node such as a mobile host or a mobile router as a network component.

The invention claimed is:

1. A communication method in a network system where a mobile communication node sends and receives a packet to and from another communication node through an access router which the mobile communication node is associated to, comprising the steps of:

transmitting the packet directly between the mobile communication node and the access router when a link layer connection is established between the mobile communication node and the access router; and transmitting the packet between the mobile communication node and the access router through multiple-hop in a mobile ad-hoc network fashion when the link layer connection is not established between the mobile communication node and the access router, and the communication method further comprising the steps of:

setting a hierarchical mode state inside the mobile communication node when the link layer connection is established, the hierarchical mode state indicating that the link layer connection is established; and setting a mesh mode state inside the mobile communication node when the link layer connection is not established, the mesh mode state indicating that the link layer connection is not established.

2. The communication method according to claim 1 further comprising the steps of:
checking at the mobile communication node whether the packet is addressed to the mobile communication node or not when the mobile communication node receives the packet, the packet being transmitted in the mobile-ad hoc network fashion; and
forwarding the packet from the mobile communication node in the mobile ad-hoc network fashion when the packet is not addressed to the mobile communication node.

3. The communication method according to claim 1 further comprising the steps of:
checking at the mobile communication node whether the packet is addressed to the mobile communication node or not when the mobile communication node receives the packet, the packet not being transmitted in the mobile-ad hoc network fashion;
checking at the mobile communication node whether the mobile communication node itself is in the hierarchical mode state or in the mesh mode state when the packet is not addressed to the mobile communication node;
forwarding the packet directly from the mobile communication node to the access router when the mobile communication node is in the hierarchical mode state; and
forwarding the packet from the mobile communication node in the mobile ad-hoc network fashion when the mobile communication node is in the mesh mode state.

4. The communication method according to claim 1 further comprising the steps of:
informing from the mobile communication node to the access router that the mobile communication node is being set either in the hierarchical mode state or in the mesh mode state; and
storing at the access router the hierarchical mode state or the mesh mode state informed from the mobile communication node as a current state of the mobile communication node.

5. The communication method according to claim 4 further comprising the steps of:
checking at the access router whether the packet is addressed to the access router or not when the access router receives the packet, the packet being transmitted in the mobile-ad hoc network fashion; and
checking at the access router whether the packet is addressed to the mobile communication node which is associated to the access router or not when the packet is not addressed to the access router;
checking at the access router the current state of the mobile communication node when the packet is addressed to the mobile communication node which is associated to the access router;
forwarding at the access router the packet directly to the mobile communication node when the current state of the mobile communication node is the hierarchical mode state; and
forwarding at the access router the packet to the mobile communication node in the mobile ad-hoc network fashion when the current state of the mobile communication node is the mesh mode state.

6. The communication method according to claim 1 wherein a tunneling packet is used as the packet transmitted in the mobile ad-hoc network fashion, the tunneling packet with an address of a first address space comprising a packet with an address of a second address space as an inner packet, the first address space being specific to the mobile ad-hoc network and different from the second address space.

7. The communication method according to claim 1 wherein the packet transmitted in the mobile ad-hoc network fashion is protected based on a security association pre-established between the mobile communication node and the access router.

8. The communication method according to claim 1 wherein the mobile communication node is a mobile host or a mobile router.

9. A mobile communication node for sending and receiving a packet to and from another communication node through an access router, the mobile communication node being associated to the access router, the mobile communication node being configured so as to transmit the packet directly between the mobile communication node and the access router when a link layer connection is established between the mobile communication node and the access router, and to transmit the packet between the mobile communication node and the access router through multiple-hop in a mobile ad-hoc network fashion when the link layer connection is not established between the mobile communication node and the access router, and
the mobile communication node being further configured so as to set a hierarchical mode state inside the mobile communication node when the link layer connection is established, the hierarchical mode state indicating that the link layer connection is established, and to set a mesh mode state inside the mobile communication node when the link layer connection is not established, the mesh mode state indicating that the link layer connection is not established.

10. The mobile communication node according to claim 9, the mobile communication node being configured so as to forward the packet in the mobile ad-hoc network fashion when receiving the packet which is transmitted in the mobile-ad hoc network fashion and is not addressed to the mobile communication node.

11. The mobile communication node according to claim 9, the mobile communication node being configured so as to inform the access router that the mobile communication node is being set either in the hierarchical mode state or in the mesh mode state.

12. The mobile communication node according to claim 9 wherein a tunneling packet is used as the packet transmitted in the mobile ad-hoc network fashion, the tunneling packet with an address of a first address space comprising a packet with an address of a second address space as an inner packet, the first address space being specific to the mobile ad-hoc network and different from the second address space.

13. The mobile communication node according to claim 9 wherein the packet transmitted in the mobile ad-hoc network fashion is protected based on a security association pre-established between the mobile communication node and the access router.

14. An access router for forwarding a packet transmitted between a mobile communication node and another node, the mobile communication node being associated to the access router, the access router being configured so as to store a hierarchical mode state or a mesh mode state as a current state of the mobile communication node, the hierarchical mode state indicating that the link layer connection with the mobile communication node is established, the mesh mode state indicating that the link layer connection is not established, and being further configured to, when receiving the packet which is transmitted in the mobile-ad hoc network fashion and is addressed to the mobile communication node, forward the packet directly to the mobile communication node in case that the current state of the mobile communication node is the hierarchical mode state, and forward the packet into its access network in the mobile ad-hoc network fashion in case that the current state of the mobile communication node is the mesh mode state.

15. The access router according to claim 14 wherein a tunneling packet is used as the packet transmitted in the mobile ad-hoc network fashion, the tunneling packet with an address of a first address space comprising a packet with an address of a second address space as an inner packet, the first address space being specific to the mobile ad-hoc network and different from the second address space.

16. The access router according to claim 14 wherein the packet transmitted in the mobile ad-hoc network fashion is protected based on a security association pre-established between the mobile communication node and the access router.

* * * * *